United States Patent
Yamamoto et al.

(10) Patent No.: US 11,139,712 B2
(45) Date of Patent: Oct. 5, 2021

(54) MOTOR AND PUMP DEVICE

(71) Applicant: NIDEC SANKYO CORPORATION, Nagano (JP)

(72) Inventors: Takashi Yamamoto, Nagano (JP); Masaki Harada, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 545 days.

(21) Appl. No.: 16/043,174

(22) Filed: Jul. 24, 2018

(65) Prior Publication Data

US 2019/0036411 A1 Jan. 31, 2019

(30) Foreign Application Priority Data

Jul. 25, 2017 (JP) .............................. JP2017-143467

(51) Int. Cl.
*H02K 3/52* (2006.01)
*H02K 1/14* (2006.01)
(Continued)

(52) U.S. Cl.
CPC .............. *H02K 3/522* (2013.01); *F04D 13/06* (2013.01); *F04D 13/0693* (2013.01);
(Continued)

(58) Field of Classification Search
CPC ...... H02K 3/522; H02K 1/146; H02K 1/2753; H02K 3/44; H02K 5/225; H02K 7/083;
(Continued)

(56) References Cited

U.S. PATENT DOCUMENTS

| 5,889,345 A | 3/1999 | Iwata et al. |
| 6,170,275 B1 * | 1/2001 | Ueno .................... F04D 29/541 |
| | | 416/174 |
| 9,903,372 B2 * | 2/2018 | Urabe ................. F24D 11/0214 |
| 2001/0026104 A1 | 10/2001 | Shimizu et al. |

(Continued)

FOREIGN PATENT DOCUMENTS

| CN | 1198578 | 11/1998 |
| CN | 104285359 | 1/2015 |

(Continued)

OTHER PUBLICATIONS

"Office Action of China Counterpart Application," with English translation thereof, dated Nov. 21, 2019, p. 1-p. 13.

*Primary Examiner* — Tulsidas C Patel
*Assistant Examiner* — Riley Owen Stout
(74) *Attorney, Agent, or Firm* — JCIPRNET

(57) ABSTRACT

A motor includes a connector detachably connected with an external cable and a resin sealing member which covers the connector. The connector includes a frame part into which a cable side connector is to be inserted and a step part on an outer peripheral face of the frame part. A shape of the step part when viewed in the inserting direction is a ring shape. The resin sealing member covers the connector from the front side and exposes an end face of the step part of the frame part and a portion of the frame part on the rear side to the step part end face to the outside, and an outer peripheral face of the resin sealing member is provided with an outer peripheral face portion which surrounds the frame part and is continuously connected with the step part end face without a step.

15 Claims, 14 Drawing Sheets

(51) Int. Cl.
*H02K 1/27* (2006.01)
*H02K 3/44* (2006.01)
*F04D 13/06* (2006.01)
*H02K 5/22* (2006.01)
*H02K 7/08* (2006.01)
*H02K 7/14* (2006.01)
*H02K 5/167* (2006.01)
*F04D 29/62* (2006.01)

(52) U.S. Cl.
CPC ........... *F04D 29/628* (2013.01); *H02K 1/146* (2013.01); *H02K 1/2753* (2013.01); *H02K 3/44* (2013.01); *H02K 5/1672* (2013.01); *H02K 5/225* (2013.01); *H02K 7/083* (2013.01); *H02K 7/14* (2013.01); *H02K 2213/03* (2013.01)

(58) Field of Classification Search
CPC .... H02K 7/14; H02K 5/1672; H02K 2213/03; F04D 29/628; F04D 13/0693; F04D 13/06
See application file for complete search history.

(56) References Cited

U.S. PATENT DOCUMENTS

2015/0302963 A1* 10/2015 Arai ................. H02K 15/12
335/299
2019/0036412 A1* 1/2019 Harada ................ H02K 3/44

FOREIGN PATENT DOCUMENTS

| | | |
|---|---|---|
| CN | 104600896 | 5/2015 |
| CN | 104682600 | 6/2015 |
| CN | 105556804 | 5/2016 |
| JP | 2016003580 | 1/2016 |

* cited by examiner

MOTOR AND PUMP DEVICE

CROSS REFERENCE TO RELATED APPLICATION

The present invention claims priority under 35 U.S.C. § 119 to Japanese Application No. 2017-143467 filed Jul. 25, 2017, the entire content of which is incorporated herein by reference.

TECHNICAL FIELD

The present invention relates to a motor including a connector which is to be connected with an external cable. Further, the present invention relates to a pump device structured to drive an impeller by the motor.

BACKGROUND

A pump device structured to rotate an impeller disposed in a pump chamber by a motor is described in Patent Literature 1 (Japanese Patent Laid-Open No. 2016-3580). In the pump device disclosed in the Patent Literature, the motor includes a rotor which is connected with the impeller, a stator disposed on an outer peripheral side with respect to the rotor, a partition member which separates the rotor from the stator, and a resin sealing member which covers the stator on an outer peripheral side of the partition member. A magnet is held by the rotor and coils are held by the stator. The resin sealing member protects the coils from water or the like flowing through the pump chamber.

Further, the motor includes a connector with which a cable side connector of an external cable is connected for supplying electrical power to the coils. The connector is provided on an opposite-to-output side of the stator so as to be separated from a pump chamber. A cable is attached to the connector from an outer peripheral side. The connector is covered by a resin sealing member except a connecting part with the cable. In the Patent Literature 1, the connecting part of the connector is protruded to an outer peripheral side from the resin sealing member.

The connecting part of the connector is commonly provided with a frame part into which a tip end part of a cable side connector is to be inserted. The resin sealing member is formed by insert molding in which the stator and the connector are disposed in a die and resin is injected and cured. In this case, the frame part is formed in a hollow shape and thus the frame part is easily deformed by pressure of the resin injected into the die at the time of molding. When the frame part is deformed at the time of molding, resin injected into the die may be entered to an inner side of the frame part through a gap space between the die and a deformed portion of the frame part. If the resin entered to the inner side of the frame part is hardened, connection of the connector with a cable side connector may be obstructed.

SUMMARY

In view of the problem described above, the present invention provides a motor in which resin that is molding material for a resin sealing member for sealing the coils is not entered to an inner side of the frame part of a connector into which a cable side connector of an external cable is to be inserted. Further, the present invention provides a pump device structured to drive an impeller by the motor.

The present invention provides a motor including a rotor, a stator having a plurality of coils which are arranged in a ring shape and surround the rotor, a connector which is located on an outer peripheral side with respect to the plurality of the coils and is capable of being detachably connected with a cable side connector of an external cable for supplying electrical power to the plurality of the coils, and a resin sealing member which covers the coils. The connector is provided with a frame part into which the cable side connector is to be inserted, the frame part is provided with a step part on an outer peripheral face of the frame part, and the step part is enlarged to an outer peripheral side from a midway position in an inserting direction of the cable side connector, and a shape of the step part when viewed from a rear side in the inserting direction is formed in a ring shape. The step part is provided with a step part end face which faces the rear side in the inserting direction. The resin sealing member covers the connector from a front side in the inserting direction and exposes the step part end face of the frame part and a portion of the frame part located on the rear side from the step part end face in the inserting direction to an outside, and an outer peripheral face of the resin sealing member comprises an outer peripheral face portion which surrounds the frame part and is continuously connected with the step part end face without a step.

In the present invention, an outer peripheral face of the frame part of the connector into which a cable side connector is to be inserted is provided with a step part at a midway position in the inserting direction. Therefore, a thickness of a portion of the frame part on the front side in the inserting direction with respect to the step part end face is increased and thus rigidity of the frame part is increased. Accordingly, the portion of the frame part on the front side in the inserting direction with respect to the step part end face is capable of enduring pressure of resin injected into the die at the time of insert molding when the stator and the connector are disposed in the die and resin is injected.

Further, the step part is provided in the outer peripheral face of the frame part and thus, in a case that the resin sealing member is molded by insert molding, when a die recessed part which accommodates a tip end side with respect to the step part end face of the frame part is provided in an inner peripheral face of the die, an inside of the die recessed part is isolated from other spaces in the die by contacting a face of an opening edge of the die recessed part in the inner peripheral face of the die with a face of the step part end face. As a result, the resin injected into the die is not entered into the die recessed part and thus a tip end portion of the frame part accommodated in the die recessed part can be exposed outside from the resin sealing member. Further, the resin injected into the die is not entered into the die recessed part and thus the tip end portion of the frame part is not deformed by pressure of the resin. As a result, the resin can be prevented from entering into an inner side of the frame part through a gap space between the die and a deformed portion of the frame part and thus hardening of the resin can be avoided on the inner side of the frame part. Therefore, connection of the connector partially covered by the resin sealing member with the cable side connector is not obstructed by the resin which is molding material for the resin sealing member.

In the present invention, it may be structured that the rotor includes an output shaft and, when one side in an axial line direction of the output shaft is referred to as an output side, and the other side in the axial line direction is referred to as an opposite-to-output side, the inserting direction is a direction directing to the output side from the opposite-to-output side. According to this structure, the size of the motor can be reduced in a radial direction in comparison with a case that the inserting direction of a cable side connector is set in a direction inclined with respect to the axial line of the output shaft. In other words, in a case that the inserting direction of a cable side connector is set in a direction inclined with respect to the axial line of the output shaft, an extending direction of the frame part is required to be inclined or perpendicular to the axial line. On the other hand, when the inserting direction is set in the axial line direction, the frame part can be provided along the axial line and thus the size of the motor can be reduced in the radial direction.

In the present invention, it may be structured that an outline shape of the frame part when viewed in a direction of the axial line is a rectangular shape, and the frame part is provided with a first frame plate portion and a second frame plate portion which are extended in a circumferential direction around the axial line and face each other in a radial direction, a third frame plate portion which connects ends of the first frame plate portion and the second frame plate portion on one side in the circumferential direction with each other, and a fourth frame plate portion which connects other ends of the first frame plate portion and the second frame plate portion on the other side in the circumferential direction with each other. The step part is provided with a first step part portion provided in an outer peripheral face of the first frame plate portion which is located on an inner peripheral side with respect to the axial line compared to the second frame plate portion, and a second step part portion which is continuously provided on outer peripheral faces of the second frame plate portion, the third frame plate portion and the fourth frame plate portion. The step part end face is provided with a first step part portion end face of the first step part portion which faces the opposite-to-output side, and a second step part portion end face of the second step part portion which faces the opposite-to-output side. The first step part portion end face is located on the opposite-to-output side with respect to the second step part portion end face, and the outer peripheral face portion of the resin sealing member is provided with a first outer peripheral face portion which is continuously connected with the first step part portion end face without a step, and a second outer peripheral face portion which is continuously connected with the second step part portion end face without a step. According to this structure, a portion of the resin sealing member which covers the connector can be increased. Therefore, the connector can be prevented from coming off from the resin sealing member.

In the present invention, it may be structured that the frame part is provided with engaging opening parts, which are to be engaged with the cable side connector, in the third frame plate portion on the opposite-to-output side with respect to the second step part portion and in the fourth frame plate portion on the opposite-to-output side with respect to the second step part portion. In a case that a cable side connector of an external cable is provided with an engaging claw, or the like, when the frame part is provided with the engaging opening part, coming-off of the cable side connector can be prevented by engaging the engaging claw with the engaging opening part. When the engaging opening part is provided in the frame part, rigidity of the frame part is reduced. However, in this case, when it is structured that a tip end side of the frame part with respect to the second step part portion is inserted into the die recessed part provided in the die at the time of insert molding, the resin is not entered into the die recessed par and thus the frame part is not deformed by pressure of the resin injected into the die.

Further, the resin injected into the die is not entered and hardened in an inner side of the frame part through the engaging opening part.

In the present invention, it is preferable that the stator includes a stator core having a ring-shaped part and a plurality of salient pole parts which are protruded from the ring-shaped part to an inner side in a radial direction, each of the coils is wound around each of the salient pole parts through an insulator, and the connector is provided with a connector housing located on an outer peripheral side with respect to the ring-shaped part. The connector housing is provided with the frame part and an extended part covered by the resin sealing member which is located between the frame part and the ring-shaped part on the output side with respect to the step part end face, and the extended part is provided with a rib which is protruded to the opposite-to-output side and is extended from the frame part toward the ring-shaped part. According to this structure, the frame part can be reinforced by the rib and thus, the frame part can be prevented from being deformed by the resin injected into the die at the time of insert molding.

In the present invention, it is preferable that the insulator closest to the connector is structured to be one resin molded product which is integrally molded with the connector housing, and the insulator is provided with a connecting part which is extended on the opposite-to-output side of the ring-shaped part and is connected with the extended part. In a case that the insulator attached to the stator core and the connector are structured as one resin molded product, when the stator core around which the coil is wound and the connector are disposed in the die and insert molding is to be performed, relative movement of the stator core and the connector due to pressure of injected resin can be prevented.

In the present invention, it is preferable that the connector includes a plurality of terminal pins for electrically connecting the cable with the plurality of the coils, the connector housing is provided with a closing part which closes an opening on the output side of the frame part, and the plurality of the terminal pins is arranged in a circumferential direction around the axial line separated from each other with a gap space therebetween and is supported by the connector housing. Each of the terminal pins is provided with an external connection part which is penetrated through the closing part and is extended on an inner side of the frame part, a connecting part which is extended from an end on the output side of the external connection part toward the ring-shaped part along the extended part on the output side of the extended part, and a coil wire connecting part which is penetrated through the extended part in the direction of the axial line from an end on a side of the ring-shaped part of the connecting part. Further, the rib is provided between the coil wire connecting parts of the terminal pins adjacent to each other in the circumferential direction. According to this structure, the frame part of the connector is reinforced by the rib and the terminal pins supported by the connector housing can be prevented from contacting with each other.

Further, the present invention provides a pump device including the motor defined in claim 1, a pump chamber, and an impeller disposed in an inside of the pump chamber. The rotor includes the output shaft which is extended in the inside of the pump chamber from an outside of the pump chamber and is connected with the impeller.

According to the present invention, connection of a cable with the connector of the motor is not obstructed by the resin which is molding material for the resin sealing member. Therefore, power feeding to the pump device can be performed surely.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of a pump device and a motor to which the present invention is applied will be described below with reference to the accompanying drawings.

(Pump Device)

Figure 1:
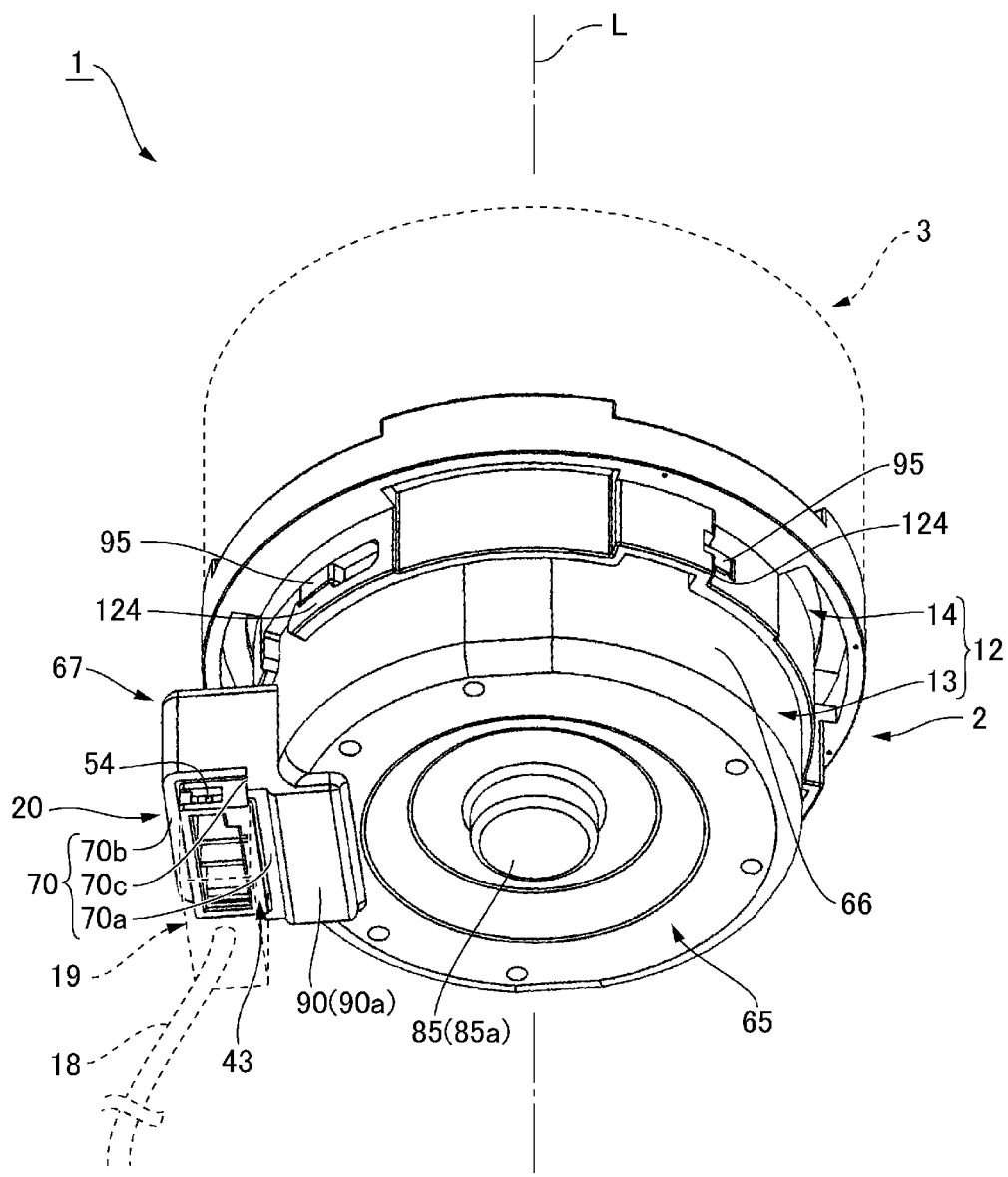
FIG. 1 is a perspective outward appearance view showing a pump device to which the present invention is applied.
Figure 2:
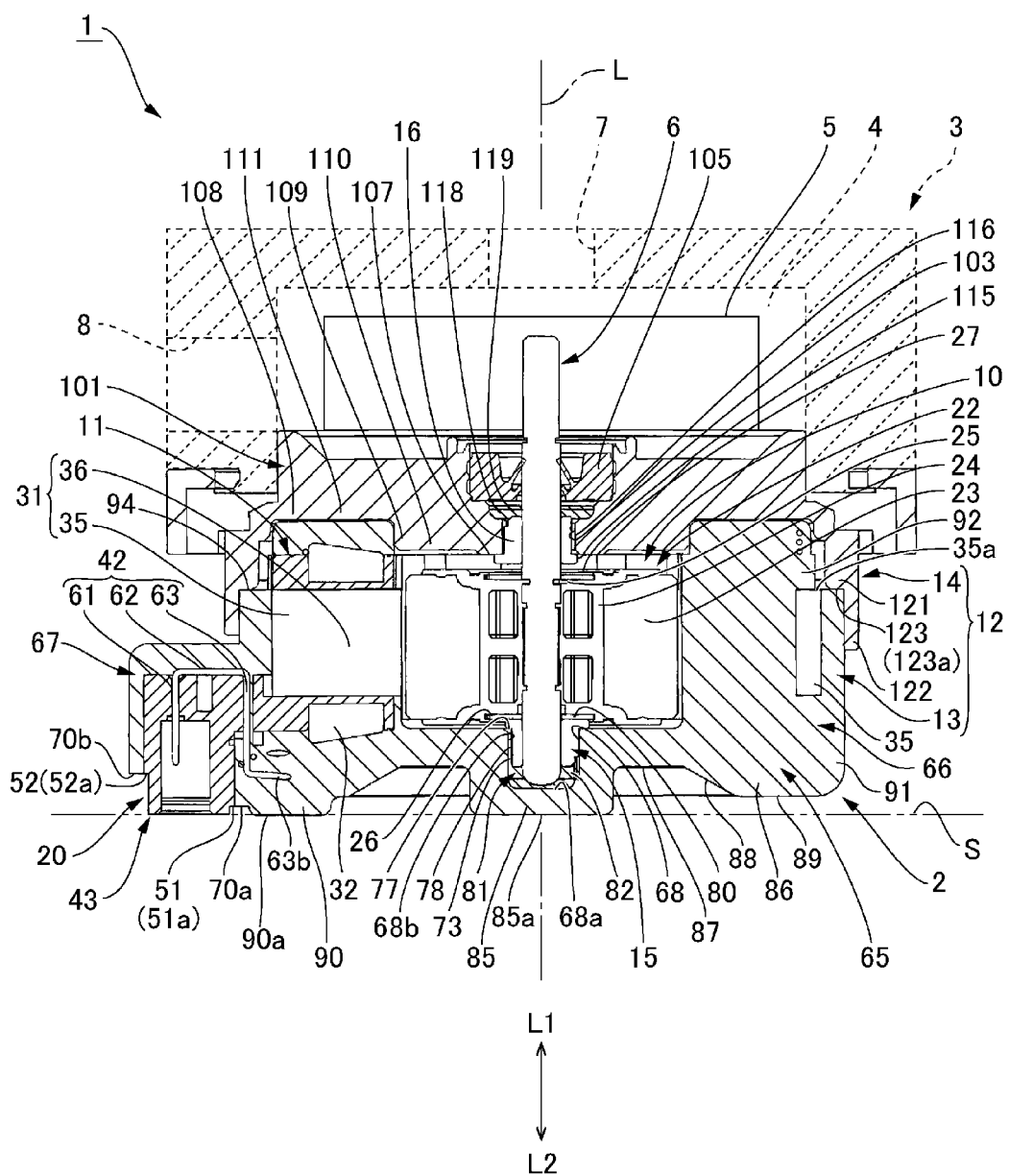
FIG. 2 is a cross-sectional view showing a pump device.
Figure 3:
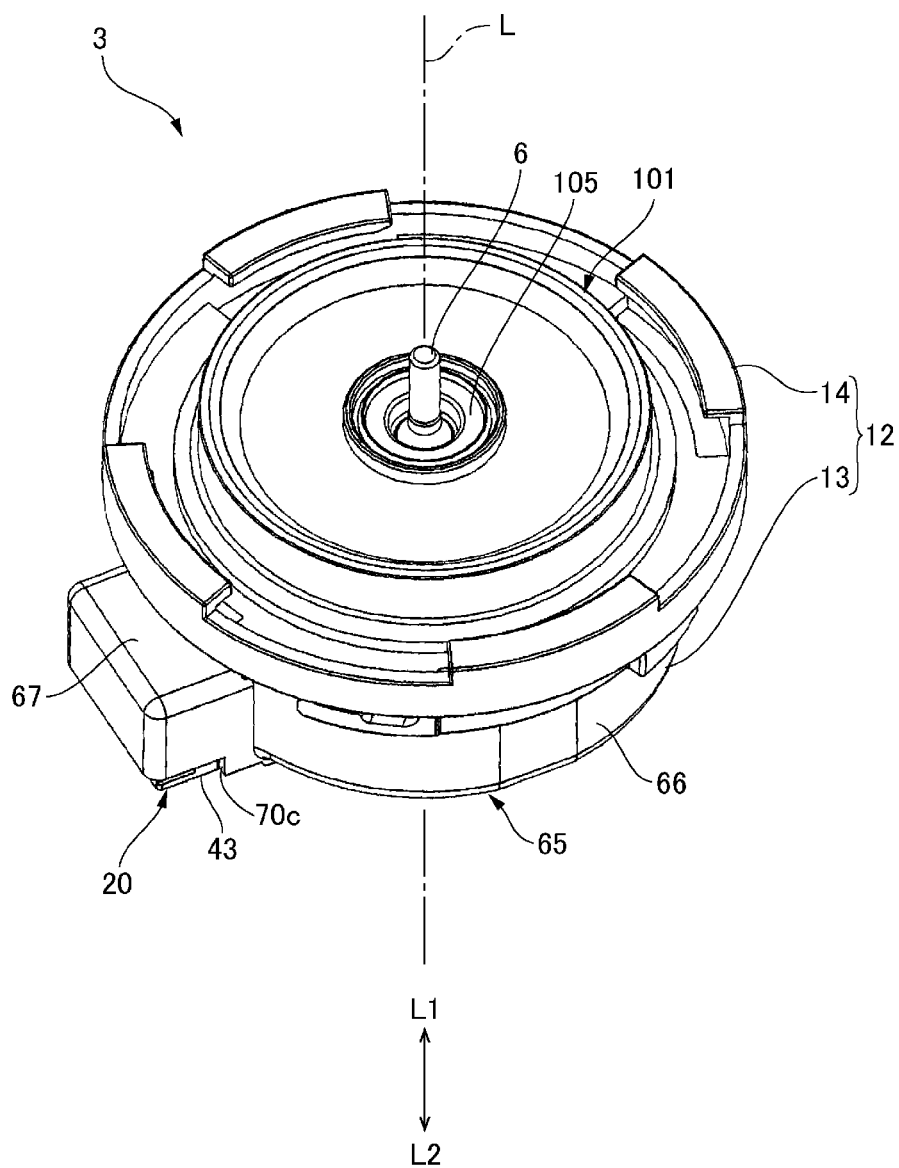
FIG. 3 is a perspective view showing a motor which is viewed from an output side.
Figure 4:
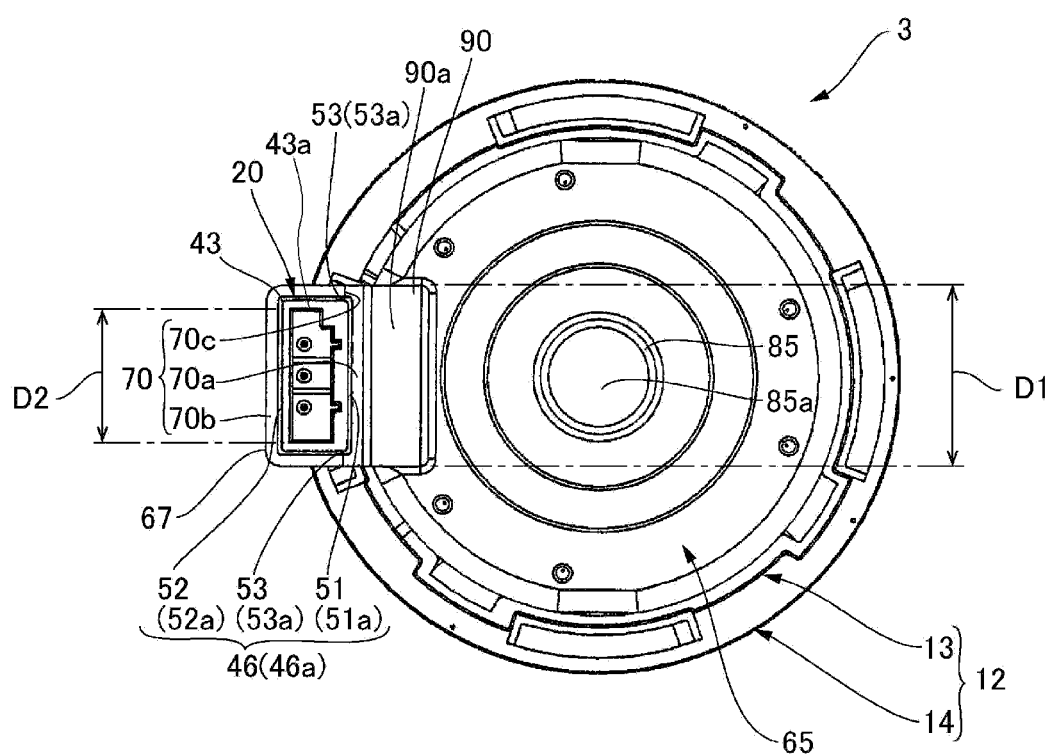
FIG. 4 is a bottom view showing a motor which is viewed from an opposite-to-output side.

FIG. 1 is a perspective outward appearance view showing a pump device to which the present invention is applied. FIG. 2 is a cross-sectional view showing a pump device. FIG. 3 is a perspective view showing a motor which is viewed from a side where an output shaft is protruded. FIG. 4 is a bottom view showing a motor. In FIGS. 1 and 2, a case body is represented by a dotted line.

As shown in FIG. 1, a pump device 1 includes a motor 2 and a case body 3 which is attached to the motor 2. As shown in FIG. 2, a pump chamber 4 is sectioned between the motor 2 and the case body 3. An impeller 5 is disposed in an inside of the pump chamber 4. The impeller 5 is attached to a shaft end portion of an output shaft 6 of the motor 2 which is extended from the motor 2 into the pump chamber 4 (outside of the pump chamber 4). The case body 3 is provided with an inlet port 7 and an outlet port 8 for a fluid. The inlet port 7 is provided at a position overlapping with an axial line "L" of the output shaft 6 of the motor 2. The outlet port 8 is provided in a direction perpendicular to the axial line "L". When the motor 2 is driven and the impeller 5 is rotated, fluid such as water taken through the inlet port 7 is discharged from the outlet port 8 through the pump chamber 4.

In the present specification, one side in the axial line "L" direction of the output shaft 6 of the motor 2 is referred to as an upper side "L1" and the other side is referred to as a lower side "L2" corresponding to an upper and lower direction in the drawing. The upper side "L1" is a side where the impeller 5 is attached to the output shaft 6 and is an output side of the motor 2. The lower side is an opposite-to-output side of the motor 2. Further, a direction perpendicular to the axial line "L" is a radial direction, and a direction around the axial line "L" is a circumferential direction. FIG. 1 is a perspective outward appearance view showing the pump device 1 which is viewed from the lower side "L2". The axial line "L" of the output shaft 6 is a rotation center line of the rotor 10 of the motor 2, and the axial line "L" direction is a rotation center line direction.

The motor 2 is a DC brushless motor. As shown in FIG. 2, the motor 2 includes a rotor 10 having the output shaft 6, a stator 11 disposed on an outer peripheral side with respect to the rotor 10, and a housing 12 which accommodates the rotor 10 and the stator 11. As shown in FIG. 3, the housing 12 includes a resin sealing member 13 which covers the stator 11 from the lower side "L2" and a cover member 14 which covers the resin sealing member 13 from the upper side "L1". The cover member 14 is fixed to the resin sealing member 13. As shown in FIG. 2, the resin sealing member 13 holds a first bearing member 15 which supports a shaft portion on the lower side "L2" of the output shaft 6 of the rotor 10 so as to be movable in the axial line "L" direction and rotatable around the axial line "L". The cover member 14 holds a second bearing member 16 which supports a middle portion of the output shaft 6 so as to be movable in the axial line "L" direction and rotatable around the axial line "L". The output shaft 6 of the rotor 10 penetrates through the cover member 14 from the lower side "L2" to the upper side "L1".

The cover member 14 is covered with the case body 3 from the upper side "L1". In this manner, the pump chamber 4 is sectioned between the cover member 14 and the case body 3, and the output shaft 6 is set in a state that the output shaft 6 is extended into the pump chamber 4 from the outside of the pump chamber 4. As shown in FIG. 1, a part of a connector 20 is exposed outside from a lower end portion of the resin sealing member 13. A cable side connector 19 of an external cable 18 for supplying electric power to the motor 2 is detachably connected with the connector 20 from the lower side "L2". In this case, a direction directing to the upper side "L1" from the lower side "L2" is an inserting direction in which the cable side connector 19 is inserted into the connector 20, and the upper side "L1" is a front side in the inserting direction and the lower side "L2" is a rear side in the inserting direction. Therefore, the connector 20 exposes its rear side end portion in the inserting direction of the cable side connector 19 outside from a lower end portion of the resin sealing member 13.

(Rotor)

Figure 5:
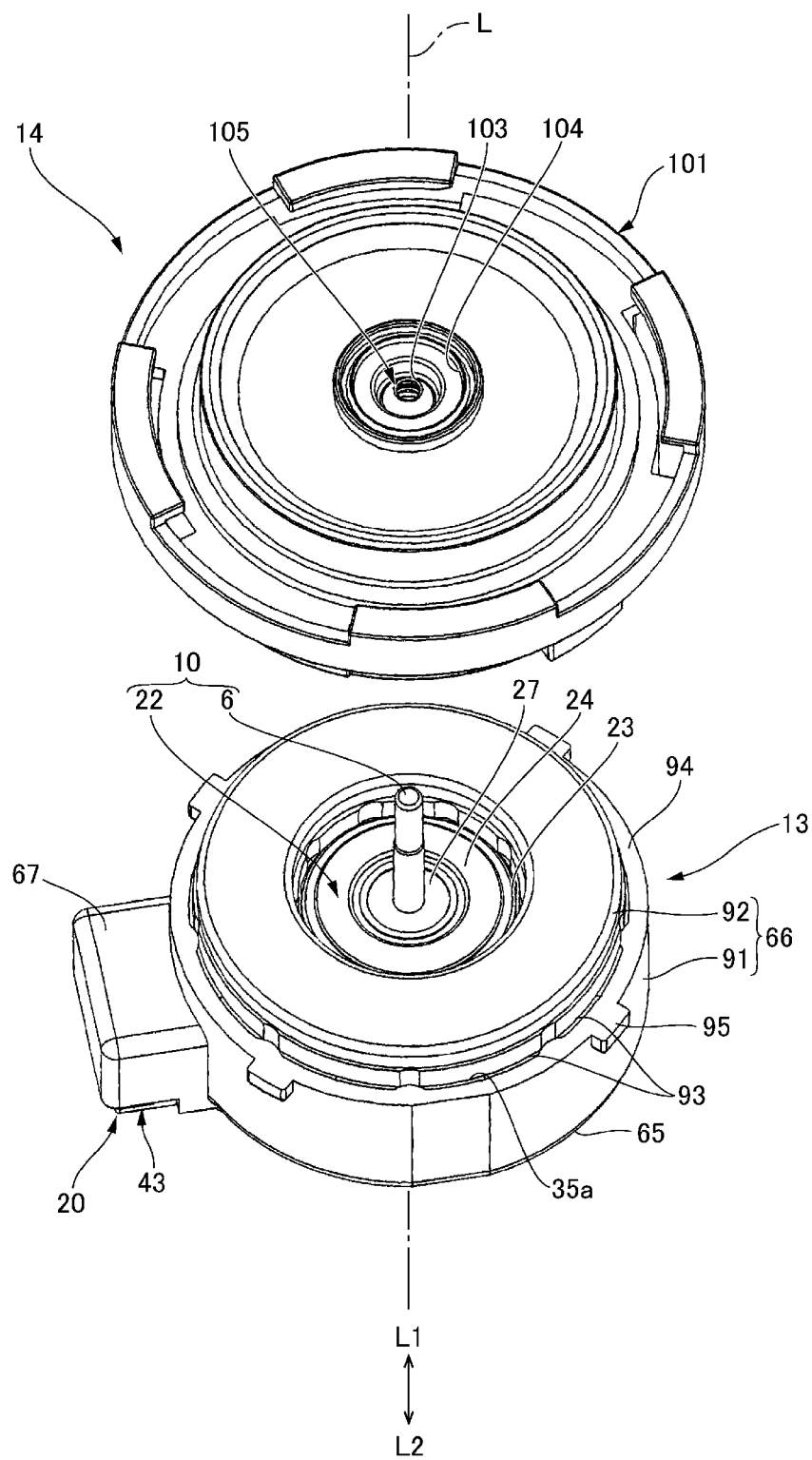
FIG. 5 is an exploded perspective view showing a motor which is viewed from an output side.
Figure 6:
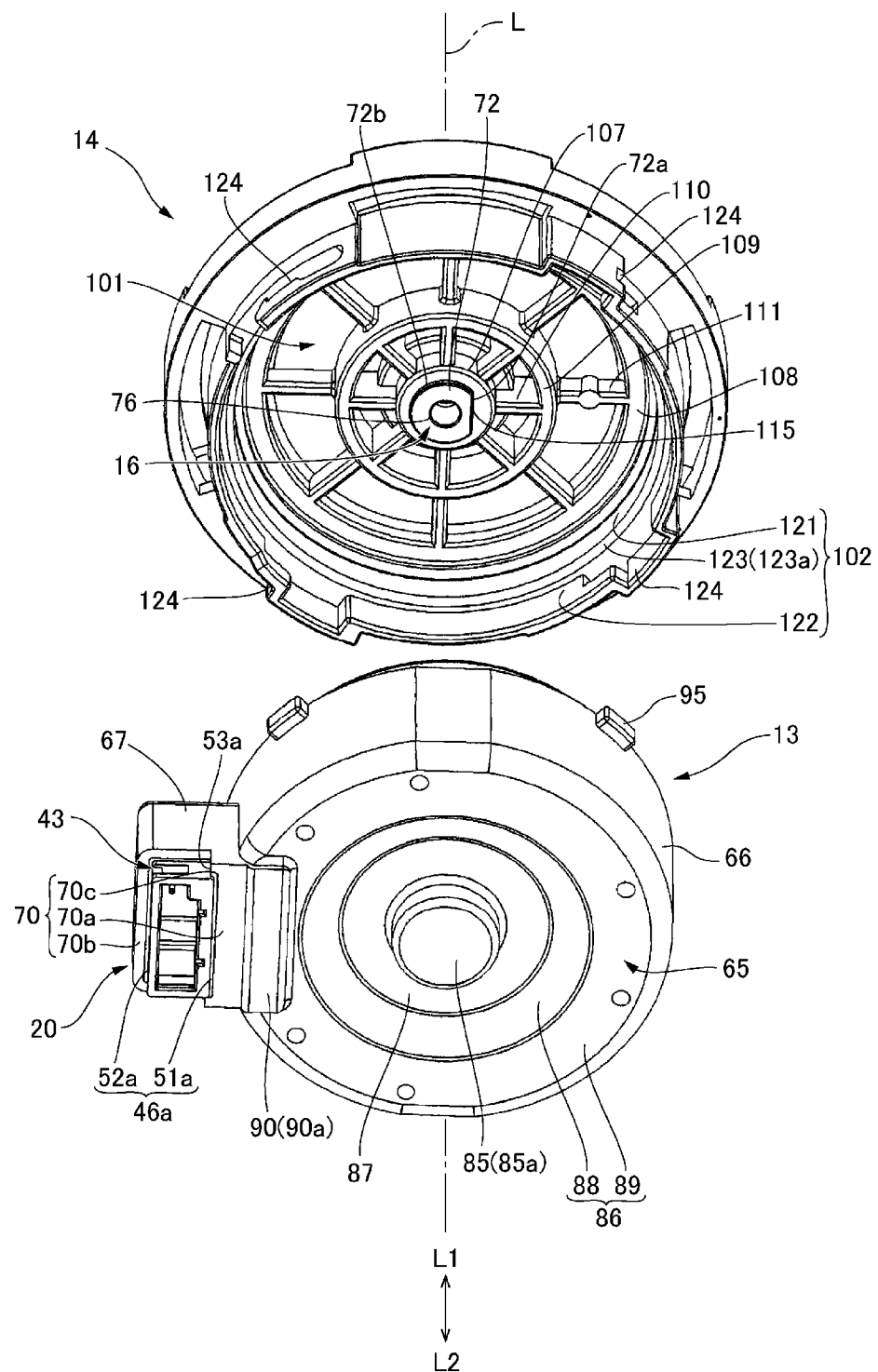
FIG. 6 is an exploded perspective view showing a motor which is viewed from an opposite-to-output side.
Figure 7:
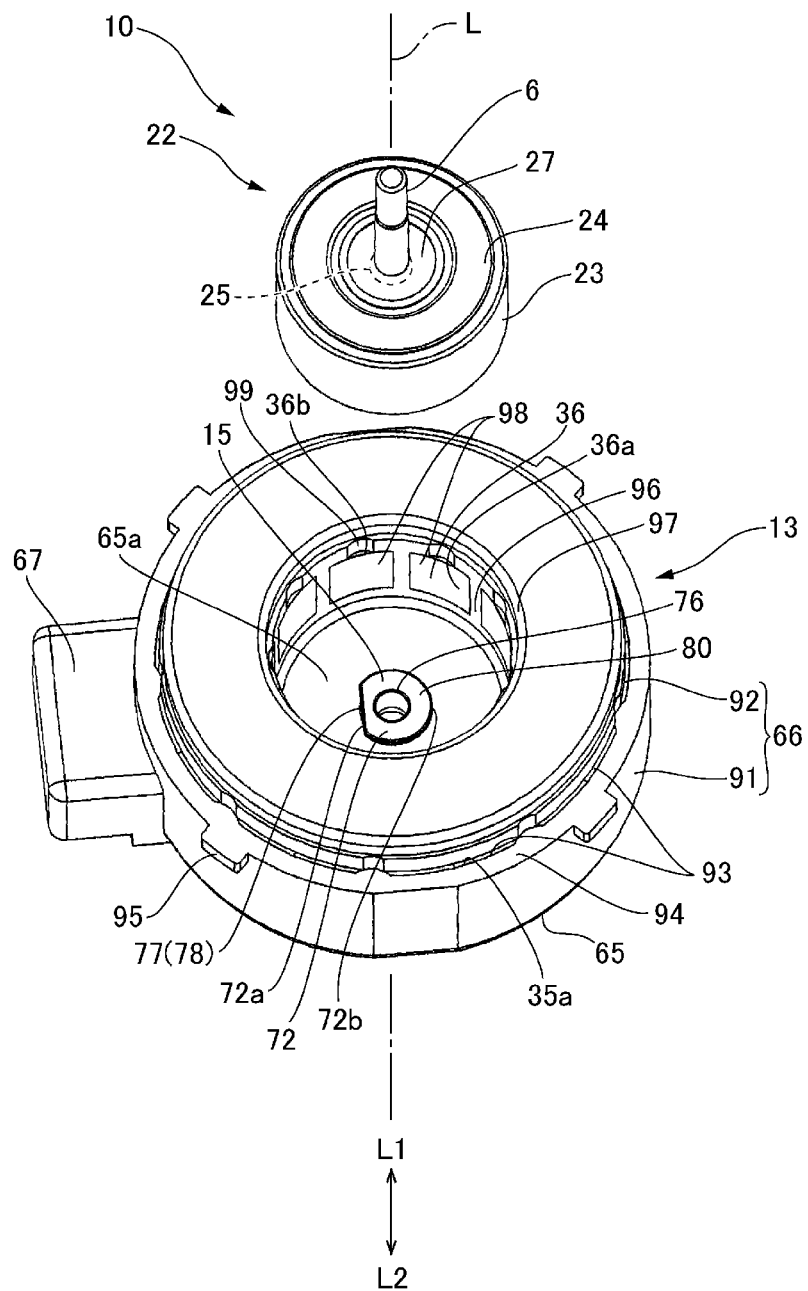
FIG. 7 is an exploded perspective view showing a motor from which a cover member is detached.
Figure 8:
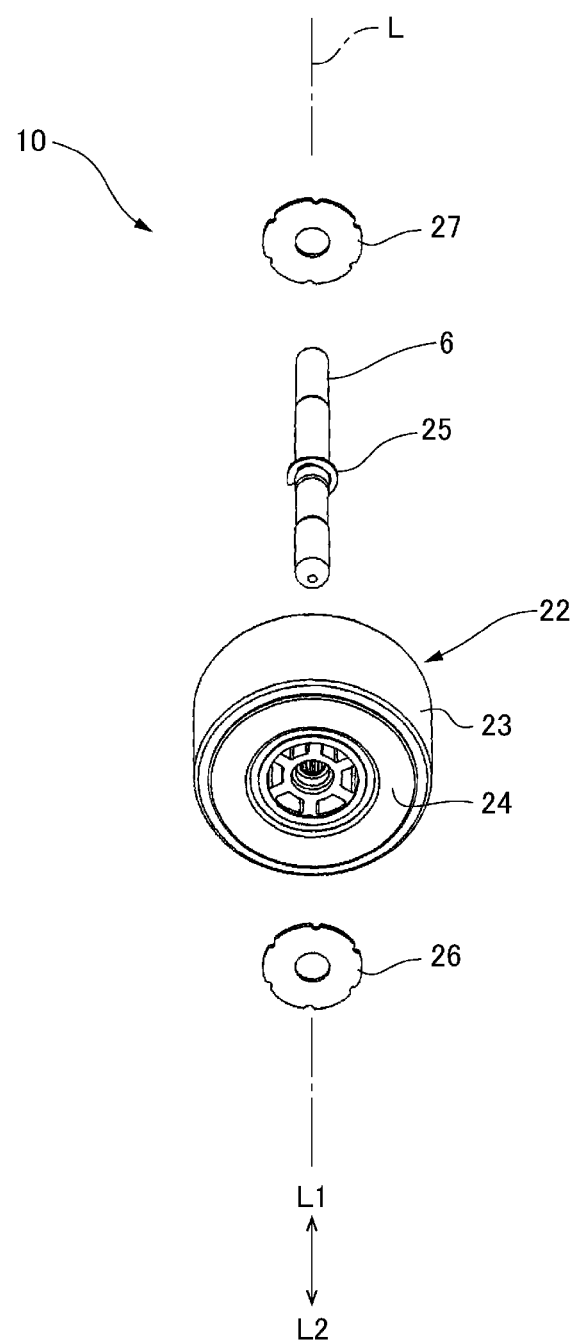
FIG. 8 is an exploded perspective view showing a rotor.

FIG. 5 is an exploded perspective view showing the motor 2 which is viewed from the upper side "L1". FIG. 6 is an exploded perspective view showing the motor 2 which is viewed from the lower side "L2". FIG. 7 is an exploded perspective view showing the motor 2 in a state that the cover member 14 is detached. FIG. 8 is an exploded perspective view showing the rotor 10.

As shown in FIG. 5, the rotor 10 includes the output shaft 6 and a rotor main body 22 which holds the output shaft 6 from the outer peripheral side. As shown in FIG. 7, the rotor main body 22 includes a ring-shaped magnet 23 surrounding the output shaft 6 and a holding member 24 which holds the output shaft 6 and the magnet 23. The magnet 23 is coaxially disposed with the output shaft 6 and an "N"-pole and an "S"-pole are alternately magnetized in a circumferential direction on its outer peripheral face. The output shaft 6 is made of stainless steel. As shown in FIG. 8, the output shaft 6 is formed with a ring-shaped groove near the center in the axial line "L" direction, and an "E"-ring 25 is fixed to the ring-shaped groove. The "E"-ring 25 is a metal plate-shaped member. The "E"-ring 25 is embedded and fixed to an upper end face of the holding member 24.

Further, the rotor main body 22 includes a first bearing plate 26 which is fixed to a lower end portion of the holding member 24 and a second bearing plate 27 which is fixed to an upper end portion of the holding member 24. Each of the first bearing plate 26 and the second bearing plate 27 is a metal plate formed in a substantially circular ring shape and, in this embodiment, the first bearing plate 26 and the second bearing plate 27 are metal washers. As shown in FIG. 2, the first bearing plate 26 covers a center portion in a radial direction of the holding member 24 from the lower side "L2" in a state that the output shaft 6 is penetrated through its center hole. The first bearing plate 26 is held by the holding member 24 in a posture perpendicular to the axial line "L". As shown in FIG. 7, the second bearing plate 27 covers the "E"-ring 25 and a center portion in the radial direction of the holding member 24 from the upper side "L1" in a state that the output shaft 6 is penetrated through its center hole. As shown in FIG. 2, the second bearing plate 27 is in surface contact with the "E"-ring 25. The second bearing plate 27 is held by the holding member 24 in a posture perpendicular to the axial line "L".

(Stator)

Figure 9A:
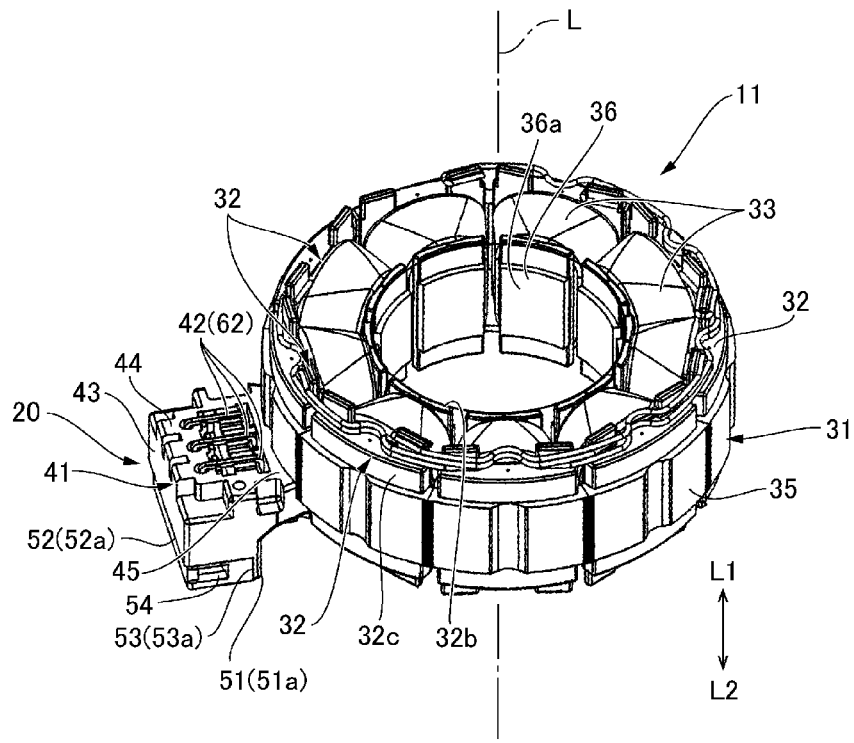
FIGS. 9A and 9B are a perspective view showing a stator and a plan view showing the stator viewed from an opposite-to-output side.
Figure 9B:
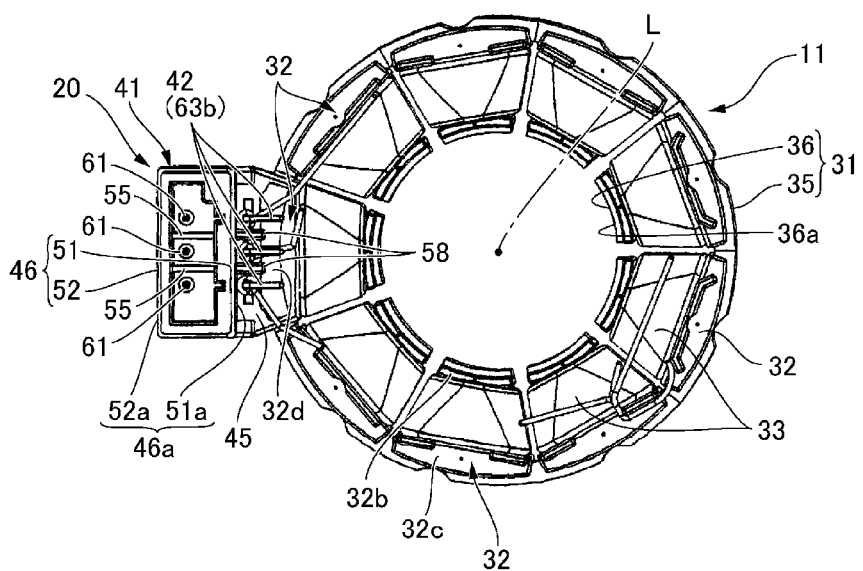
Figure 10A:
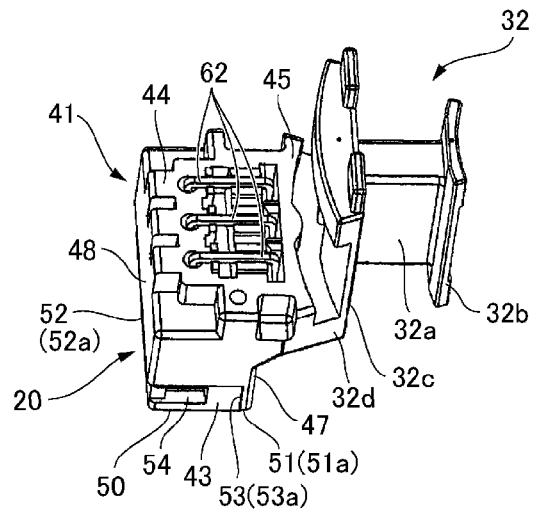
FIGS. 10A, 10B and 10C are perspective views and a cross-sectional view showing a connector and an insulator which are structured to be an integrally molded product.
Figure 10B:
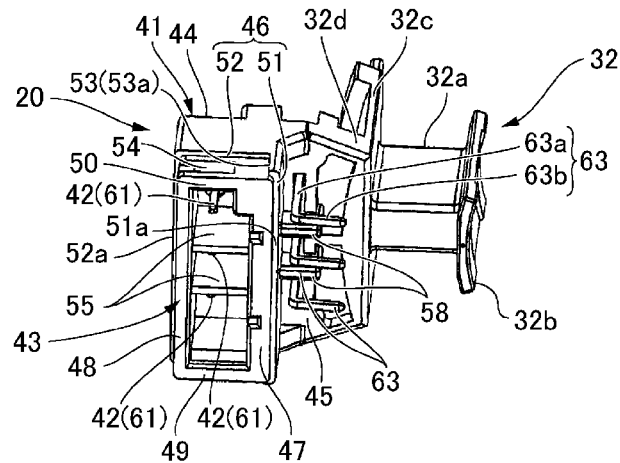
Figure 10C:
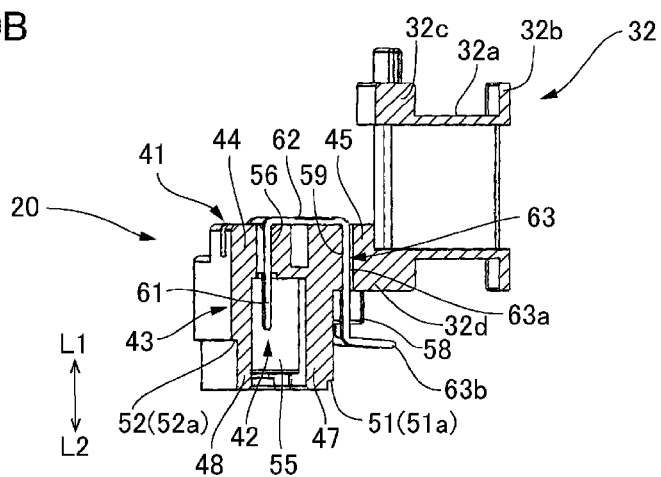

FIG. 9A is a perspective view showing the stator 11 and the connector 20 which are viewed from the upper side "L1" and FIG. 9B is a plan view showing the stator 11 and the connector 20 which are viewed from the lower side "L2". FIG. 10A is a perspective view showing the connector 20 and an insulator 32 integrated with the connector 20 which are viewed from the upper side "L1", FIG. 10B is a perspective view showing the connector 20 and the insulator 32 viewed from the lower side "L2", and FIG. 10C is a cross-sectional view showing the connector 20 and the insulator 32 integrated with the connector 20.

As shown in FIGS. 9A and 9B, the stator 11 includes a ring-shaped stator core 31 disposed on an outer peripheral side with respect to the rotor 10 and a plurality of coils 33 which are wound around the stator core 31 through insulators 32. The plurality of the coils 33 are arranged in a ring shape around the axial line "L" in a posture that their center holes are directed in a radial direction. The connector 20 is disposed on an outer peripheral side with respect to the coils 33 and the stator core 31.

The stator core 31 is a laminated core which is structured of thin magnetic plates made of magnetic material which are laminated. The stator core 31 is provided with a ring-shaped part 35 and a plurality of salient pole parts 36 which are protruded to an inner side in the radial direction from the ring-shaped part 35. The plurality of the salient pole parts 36 is formed at equal angular pitches and is disposed at a constant pitch in a circumferential direction. In this embodiment, the plurality of the salient pole parts 36 is formed at an angular pitch of 40° with the axial line "L" as a center. As a result, the stator core 31 is provided with nine salient pole parts 36. An inner peripheral side end face 36a of the salient pole part 36 is a circular arc face with the axial line "L" as a center and faces an outer peripheral face of the magnet 23 of the rotor 10 through a slight gap.

Each of the insulators 32 is made of resin and has an insulation property. Each of the insulators 32 is formed in a tube shape with flanges whose both ends in the radial direction are provided with flange parts, and the insulator 32 is attached to the salient pole part 36 so that an axial direction of the insulator 32 formed in a tube shape and the radial direction of the stator 11 are coincided with each other. In other words, each insulator 32 is, as shown in FIG. 10A, provided with a tube part 32a into which the salient pole part 36 is inserted, an inner peripheral side flange part 32b which is enlarged from an end portion on an inner peripheral side of the tube part 32a, and an outer peripheral side flange part 32c which is enlarged from an end portion on an outer peripheral side of the tube part 32a. As shown in FIGS. 9A and 9B, the outer peripheral side flange part 32c covers an upper face and an under face of the ring-shaped part 35 of the stator core 31 to a midway position in the radial direction.

As shown in FIGS. 10A, 10B and 10C, in the plurality of the insulators 32, the insulator 32 disposed on an inner side in the radial direction of the connector 20 is integrally formed with a connector housing 41 of the connector 20. In other words, the insulator 32 closest to the connector 20 and the connector housing 41 are structured as an integrally molded product made of resin. The insulator 32 integrally molded with the connector housing 41 is, as shown in FIG. 9B and FIGS. 10A, 10B and 10C, provided with a connecting part 32d which is extended from the outer peripheral side flange part 32c to an outer peripheral side along an under end face of the ring-shaped part 35 of the stator core 31 and is continuously connected with the connector 20.

Each of the plurality of the coils 33 is wound around each of the plurality of the salient pole parts 36 through the insulator 32. Each coil 33 in a wound state around the salient pole part 36 through the insulator 32 is respectively protruded to the upper side "L1" and the lower side "L2" toward an outer side in the radial direction (ring-shaped part 35 side).

The coil 33 is structured of a conducting wire (coil wire) made of aluminum alloy or copper alloy. In this embodiment, a conducting wire made of aluminum alloy covered with copper alloy is used. In this embodiment, the number of each of the salient pole parts 36, the insulators 32 and the coils 33 is nine (9). The motor 2 is a three-phase brushless motor, and three of nine coils 33 are "U"-phase coils, three of the remaining six coils 33 are "V"-phase coils, and remaining three coils are "W"-phase coils. The "U"-phase coil, the "V"-phase coil and the "W"-phase coil are arranged in this order in a circumferential direction. In accordance with an embodiment of the present invention, other arrangements may be adopted.

Three "U"-phase coils are formed so that one conducting wire is successively wound around three salient pole parts 36, three "V"-phase coils are formed so that one conducting wire is successively wound around three salient pole parts 36, and three "W"-phase coils are formed so that one conducting wire is successively wound around three salient pole parts 36. As shown in FIG. 9B, the three conducting wires which structure the "U"-phase coils and the "V"-phase coils and the "W"-phase coils are connected with terminal pins 42 of the connector 20.

(Connector)

The connector 20 includes the connector housing 41 which is integrally molded with the insulator 32 and three terminal pins 42 which are supported by the connector housing 41. As shown in FIGS. 9A and 9B, the connector housing 41 is disposed on an outer peripheral side with respect to the stator core 31.

As shown in FIG. 10C, the connector housing 41 is provided with a frame part 43 which is extended in the axial line "L" direction, a closing part 44 which closes an opening on the upper side "L1" of the frame part 43, and an extended part 45 which is extended toward the stator core 31 from the frame part 43 and the closing part 44. A male-type cable side connector 19 is detachably inserted into the frame part 43 from the lower side "L2". The connecting part 32d of the insulator 32 is continuously connected with the extended part 45 from an inner peripheral side.

As shown in FIG. 9B, an outline shape of the frame part 43 when viewed in the axial line "L" direction is a rectangular shape and its longitudinal direction is directed in a circumferential direction. The frame part 43 is provided with a step part 46 on its outer peripheral face so as to be enlarged to an outer peripheral side from a midway position in the axial line "L" direction from the lower side "L2" to the upper side "L1" (inserting direction of the cable side connector 19). A shape of the step part 46 is a ring shape when viewed from the lower side "L2" (when viewed from a rear side in the inserting direction). Specifically, as shown in FIG. 10B, the frame part 43 is provided with a first frame plate portion 47 and a second frame plate portion 48 which are extended in the circumferential direction and face each other in the radial direction, a third frame plate portion 49 which connects ends on one side in the circumferential direction of the first frame plate portion 47 and the second frame plate portion 48, and a fourth frame plate portion 50 which connects ends on the other side in the circumferential direction of the first frame plate portion 47 and the second frame plate portion 48. The step part 46 is provided with a first step part portion 51 provided on an outer peripheral face of the first frame plate portion 47 disposed on the inner peripheral side close to the axial line "L", and a second step part portion 52 which is provided on outer peripheral faces of the second frame plate portion 48, the third frame plate portion 49 and the fourth frame plate portion 50. The first step part portion 51 is provided with a first step part portion end face 51a facing the lower side "L2", and the second step part portion 52 is provided with a second step part portion end face 52a facing the lower side "L2". The first step part portion end face 51a and the second step part portion end face 52a are faces which are respectively perpendicular to the axial line "L".

In this embodiment, the first step part portion 51 is located on the lower side "L2" with respect to the second step part portion 52. Therefore, the first step part portion end face 51a of the first step part portion 51 is located on the lower side "L2" with respect to the second step part portion end face 52a of the second step part portion 52. However, as shown in FIG. 9B, when the frame part 43 is viewed in the axial line "L" direction, the first step part portion end face 51a and the second step part portion end face 52a structure a step part end face 46a in a ring shape. In this embodiment, as shown in FIG. 10A, an outer peripheral face of the third frame plate portion 49 is formed with a connection step part 53 which is extended in the axial line "L" direction and connects the first step part portion end face 51a with the second step part portion end face 52a. Similarly, an outer peripheral face of the fourth frame plate portion 50 is formed with a connection step part 53 which is extended in the axial line "L" direction and connects the first step part portion end face 51a with the second step part portion end face 52a. Each of the connection step parts 53 is provided with a connection step part end face 53a which is extended in the axial line "L" direction and faces the outer peripheral side.

Further, an engaging opening part 54 structured to engage with a cable side connector is provided on the lower side "L2" with respect to the second step part portion 52 of the second frame plate portion 48 and on an outer peripheral side with respect to the connection step part end face 53a. Similarly, an engaging opening part 54 structured to engage with the cable side connector is also provided on the lower side "L2" with respect to the second step part portion 52 of the fourth frame plate portion 50 and on an outer peripheral side with respect to the connection step part end face 53a. Each of the engaging opening parts 54 is a rectangular through hole and, in a case that hooks are provided in the cable side connector, the hooks are engaged with the engaging opening parts 54 from outer sides in the circumferential direction of the frame part 43.

As shown in FIG. 10B, two partition walls 55 which partially section an inside space of the frame part 43 into three spaces are provided on an inner side of the frame part 43. The partition wall 55 is extended from the closing part 44 to the lower side "L2" in parallel to the third frame plate portion 49 and the fourth frame plate portion 50. As shown in FIG. 10C, each portion of the closing part 44 which is located in each of the spaces partially sectioned by the partition walls 55 is provided with a through hole 56 penetrating in the axial line "L" direction.

As shown in FIGS. 9B and 10B, the extended part 45 is provided with two ribs 58 which are protruded to the lower side "L2" and are extended from the frame part 43 to a side of the ring-shaped part 35 of the stator core 31. Each of the ribs 58 is located on an inner peripheral side with respect to each of the partition walls 55 on the inner side of the frame part 43. As shown in FIG. 10C, a lower end of each of the ribs 58 is located on the upper side "L1" with respect to the second step part portion end face 52a. In the extended part 45, a through hole 59 which penetrates in the axial line "L" direction is provided in each of a portion which is located between two ribs 58, a portion located on one side with respect to one of the two ribs 58 which is located on the one side in the circumferential direction, and a portion located on the other side with respect to the other of the two ribs 58 which is located on the other side in the circumferential direction. Each through hole 59 is located on an inner peripheral side with respect to each of the through holes 56 provided in the closing part 44.

Each of the terminal pins 42 is formed by bending a metal wire whose cross-sectional shape is a quadrangular shape. As shown in FIG. 10C, the terminal pin 42 is provided with an external connection part 61, which is penetrated through the through hole 56 of the closing part 44 from the upper side "L1" to the lower side "L2" and is extended to an inner side of the frame part 43, a connecting part 62 which is extended from an upper end of the external connection part 61 to a side of the ring-shaped part 35 of the stator core 31 (side of the insulator 32) along an upper face of the extended part 45, and a coil wire connecting part 63 which is penetrated through the through hole 59 of the extended part 45 from an end of the connecting part 62 on the side of the ring-shaped part 35 and is extended to the lower side "L2" from the upper side "L1". Each terminal pin 42 is press-fitted to the through hole 56 of the closing part 44 and the through hole 59 of the extended part 45. In this manner, the three terminal pins 42 are arranged at equal intervals in the circumferential direction.

The external connection parts 61 of the terminal pins 42 are respectively disposed in three spaces which are sectioned on the inner side of the frame part 43 by the partition walls 55. The external connection parts 61 of the respective terminal pins 42 are prevented from contacting with each other by the partition wall 55. When a cable side connector 19 is connected with the connector 20, the external connection part 61 is electrically connected with a cable 18. Further, the rib 58 is provided between two of the three coil wire connecting parts 63 adjacent to each other in the circumferential direction. As a result, the coil wire connecting parts 63 are respectively prevented from contacting with each other.

In this embodiment, the connecting part 62 is extended in a direction perpendicular to the axial line "L" between the external connection part 61 and the coil wire connecting part 63. Further, as shown in FIG. 2, when viewed in a direction perpendicular to the axial line "L", the connecting part 62 is located at a position overlapping with the stator core 31. Therefore, when the terminal pin 42 is to be supported by the connector housing 41 (when the terminal pin 42 is to be press-fitted into the through hole 56 and the through hole 59), even in a case that a force is applied to the connector housing 41 in a direction inclined to the axial line "L" and deformation may be occurred between the insulator 32 and the housing 12 which are an integrally molded product, the deformation is restrained because the connecting part 62 of the terminal pin 42 located on an outer peripheral side of the stator core 31 supports the connector housing 41.

As shown in FIG. 10C, the coil wire connecting part 63 is provided with a straight part 63a, which is extended in a straight line shape to the lower side "L2" from the connecting part 62 and reaches to the lower side "L2" with respect to the stator 11, and a bending part 63b which is bent from the straight part 63a toward the stator 11. As shown in FIG. 9B, when viewed in the axial line "L" direction, a tip end of the bending part 63b is overlapped with the ring-shaped part 35 of the stator core 31. The coil wire connecting parts 63 of the three terminal pins 42 are respectively connected with a conducting wire structuring the "U"-phase coil, a conducting wire structuring the "V"-phase coil, and a conducting wire structuring the "W"-phase coil. The bending part 63b is a coming-off prevention part which prevents the coil 33 from coming off from the terminal pin 42. In this case, two ribs 58 located between two adjacent coil wire connecting parts 63 are, as shown in FIG. 10C, located on the upper side "L1" with respect to the bending part 63b.

(Resin Sealing Member)

Figure 11:
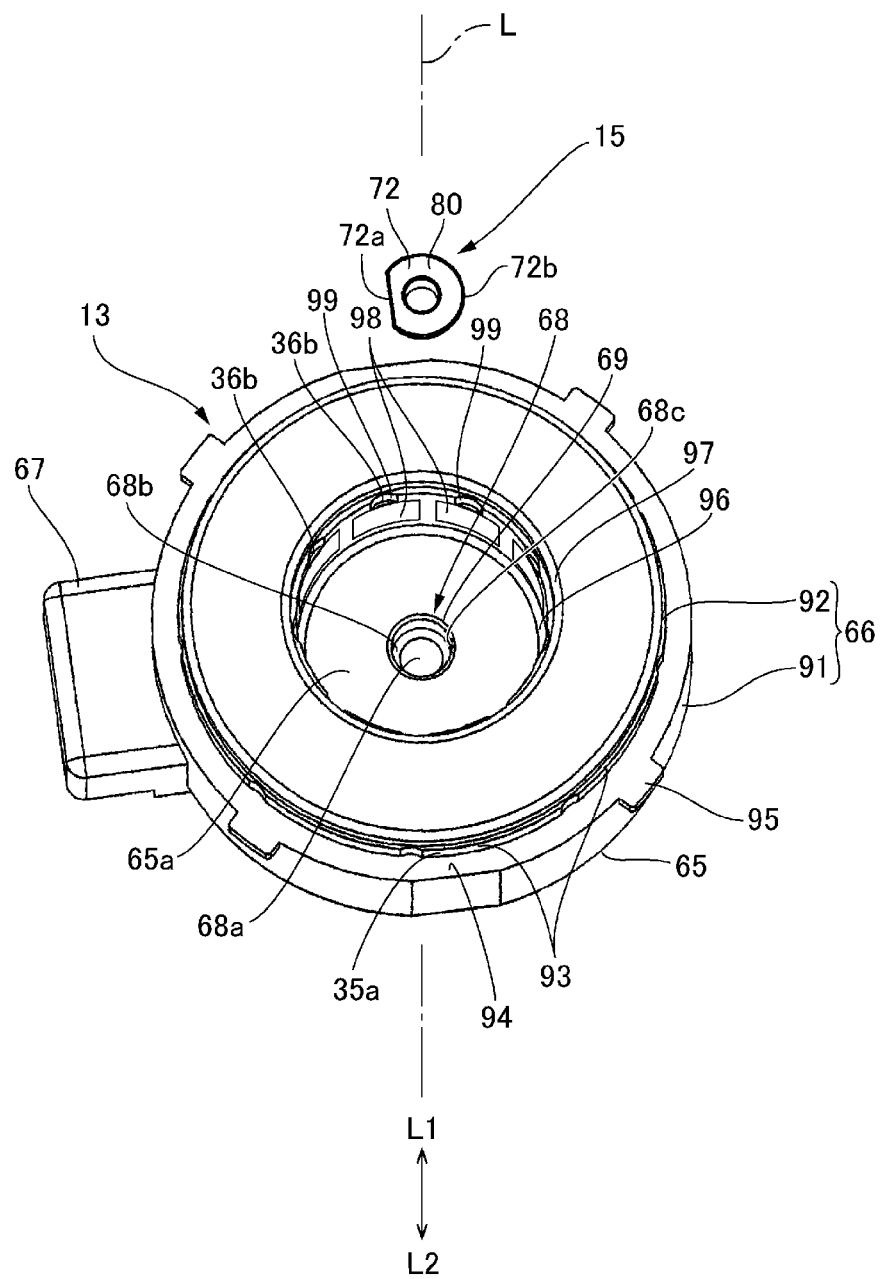
FIG. 11 is an exploded perspective view showing a resin sealing member and a first bearing member.

FIG. 11 is an exploded perspective view showing the resin sealing member 13 and the first bearing member 15. As shown in FIGS. 6 and 7, the resin sealing member 13 is provided with a sealing member bottom part 65 in a disk shape (opposite-to-output side sealing part), which covers the coils 33, the insulators 32 and the stator core 31 from the lower side "L2", a sealing member tube part 66 which is extended to the upper side "L1" from the sealing member bottom part 65, and a connector sealing part 67 which is protruded to an outer peripheral side from the sealing member tube part 66. The resin sealing member 13 covers the coils 33 and the insulators 32. Further, the resin sealing member 13 covers the stator core 31 except an outer peripheral edge portion of an upper face of the ring-shaped part 35 and end portions on an inner peripheral side of the salient pole parts 36.

As shown in FIG. 11, the sealing member bottom part 65 is provided with a bearing member holding recessed part 68 (bearing member holding part), which holds the first bearing member 15, in an opposed face 65a facing the rotor main body 22 on an inner side with respect to the stator core 31. The bearing member holding recessed part 68 is provided with a circular bottom face 68a and a ring-shaped inner wall face 68b which is stood up from an outer peripheral edge of the bottom face 68a and is extended to the upper side "L1". A groove 68c extended in the axial line "L" direction is formed in a part in the circumferential direction of the ring-shaped inner wall face 68b. Further, the sealing member bottom part 65 is provided with a chamfer part 69 in a taper shape in the opposed face 65a so as to be inclined to the lower side "L2" toward a side of the bearing member holding recessed part 68 (toward the axial line "L") in an opening edge of the bearing member holding recessed part 68.

Figure 12A:
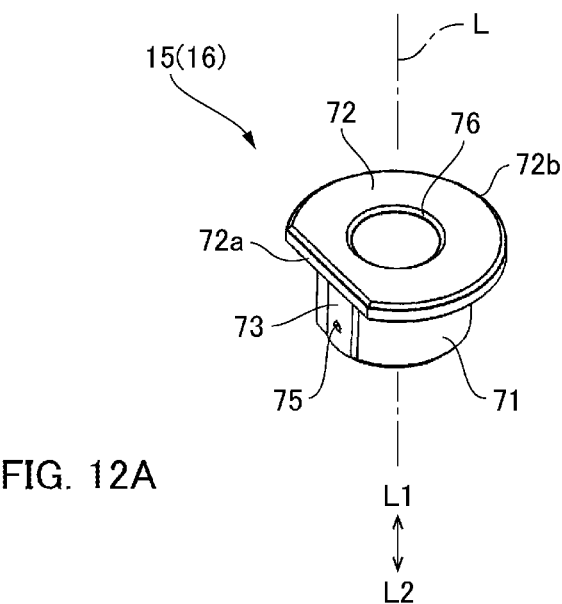
FIGS. 12A and 12B are perspective views showing a first bearing member.
Figure 12B:
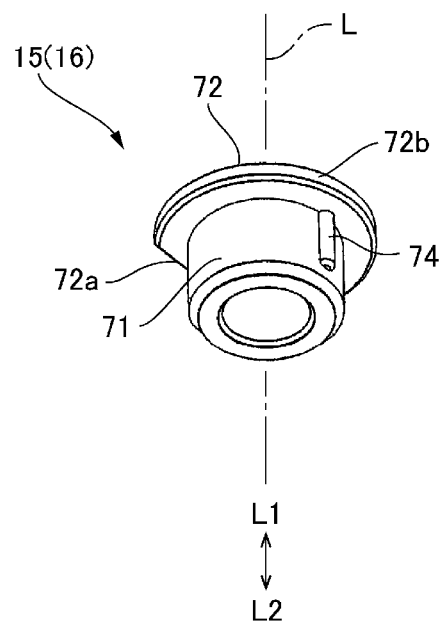

FIG. 12A is a perspective view showing the first bearing member 15 which is viewed from the upper side "L1" and FIG. 12B is a perspective view showing the first bearing member 15 which is viewed from the lower side "L2". The first bearing member 15 is made of resin. As shown in FIGS. 12A and 12B, the first bearing member 15 is provided with a tube part 71 having a center hole through which the output shaft 6 is penetrated, and a flange part 72 which is enlarged to an outer peripheral side from the upper end of the tube part 71. A portion in the circumferential direction of an outer peripheral face of the tube part 71 is, as shown in FIG. 12A, formed with a groove part 73 which is extended in the axial line "L" direction with a constant width. Further, as shown in FIG. 12B, a projecting part 74 extended in the axial line "L" direction with a constant width is formed on an outer peripheral face of the tube part 71 on an opposite side to the groove part 73 with the axial line "L" interposed therebetween. The groove part 73 is formed with a gate trace 75 which was connected with a gate for resin injection when the first bearing member 15 was injection-molded. A contour of the flange part 72 is, when viewed in the axial line "L" direction, a "D"-shape having a straight contour portion 72a extended in a straight shape and a circular arc contour portion 72b in a circular arc shape connecting both ends of the straight contour portion 72a with each other. The straight contour portion 72a is provided at the same angular position as the groove part 73 around the axial line "L". In other words, the straight contour portion 72a is located on an opposite side to the projecting part 74 with the axial line "L" interposed therebetween. An upper end face of the tube part 71 located on an inner peripheral side of the flange part 72 is formed with a tapered face 76 which is inclined to the lower side "L2" toward the center hole of the tube part 71.

The tube part 71 of the first bearing member 15 is inserted into the bearing member holding recessed part 68 in a posture that positions of the projecting part 74 and the groove 68c of the bearing member holding recessed part 68 are coincided with each other around the axial line "L". Next, as shown in FIG. 7, the flange part 72 is abutted with the opposed face 65a of the sealing member bottom part 65 from the upper side "L1" and the first bearing member 15 is fixed to the bearing member holding recessed part 68. In a state that the first bearing member 15 is fixed to the bearing member holding recessed part 68, an upper end face 80 of the flange part 72 is perpendicular to the axial line "L". The tube part 71 and the bottom face 68a of the bearing member holding recessed part 68 are separated from each other in the axial line "L" direction.

Further, in a state that the first bearing member 15 is fixed to the bearing member holding recessed part 68, an opening 77 is formed between the cut-out part 69 in a taper shape in the opposed face 65a provided at an opening edge of the bearing member holding recessed part 68 and the straight contour portion 72a of the flange part 72.

When the rotor 10 is supported by the first bearing member 15, a shaft end portion of the output shaft 6 is penetrated through the tube part 71. The tube part 71 supports the output shaft 6 (rotor 10) so as to be movable in the axial line "L" direction and rotatable around the axial line "L". The flange part 72 is capable of slidably contacting with the rotor main body 22 (first bearing plate 26) from the lower side "L2". As shown in FIG. 2, when the rotor main body 22 is slidably contacted with the flange part 72, a tip end of a protruded shaft portion of the output shaft 6 which is protruded from the tube part 71 to the lower side "L2" is separated from the bottom face 68a of the bearing member holding recessed part 68 in the axial line "L" direction.

A space between the bottom face 68a of the bearing member holding recessed part 68 and the tube part 71 of the first bearing member 15 on an inner side of the bearing member holding recessed part 68 is structured as a first lubricant storage part 81 where lubricant 82 such as grease is stored. In this embodiment, the opening 77 of the opposed face 65a and the first lubricant storage part 81 are communicated with each other through a gap space between the groove part 73 of the tube part 71 and the ring-shaped inner wall face 68b of the bearing member holding recessed part 68. In other words, the gap space between the groove part 73 of the tube part 71 and the ring-shaped inner wall face 68b of the bearing member holding recessed part 68 is a communication path 78 structured to communicate the opening 77 with the first lubricant storage part 81.

As shown in FIG. 6, an under face of the sealing member bottom part 65 is provided with a first protruded part 85 in a circular cylindrical shape (protruded part) which is protruded to the lower side "L2" from a center portion and a ring-shaped protruded part 86 which is protruded to the lower side "L2" so as to surround the first protruded part 85 on an outer peripheral side with respect to the first protruded part 85. A ring-shaped face 87 perpendicular to the axial line "L" is provided between the first protruded part 85 and the ring-shaped protruded part 86. The ring-shaped protruded part 86 is provided with a ring-shaped tapered face 88 which is inclined to the lower side "L2" toward an outer peripheral side from the ring-shaped face 87, and a ring-shaped end face 89 which is extended from the tapered face 88 toward an outer peripheral side in a direction perpendicular to the axial line "L". An outer peripheral edge portion of the ring-shaped end face 89 where the connector 20 is located on an outer side in the radial direction is provided with a second protruded part 90. As shown in FIG. 4, a shape of the second protruded part 90 which is viewed in the axial line "L" direction is a rectangular shape which is long in the circumferential direction. The second protruded part 90 is located between the first protruded part 85 and the connector 20 in the radial direction. The second protruded part 90 is located at a position closer to the connector 20 than the first protruded part 85.

As shown in FIG. 2, the first protruded part 85 is overlapped with the bearing member holding recessed part 68 when viewed in the axial line "L" direction. The bottom face 68a of the bearing member holding recessed part 68 is located on an inner side of the first protruded part 85. Therefore, at least a lower side portion of the first lubricant storage part 81 is located on an inner side of the first protruded part 85. The tapered face 76 of the ring-shaped protruded part 86 is provided along inclinations of lower sides "L2" of the coils 33 which are wound around the respective salient pole parts 36. The second protruded part 90 is, when viewed in the axial line "L" direction, overlapped with an outer peripheral edge portion of the ring-shaped part 35 of the stator core 31, and overlapped with the tip ends of the bending parts 63b of the coil wire connecting parts 63 of the terminal pins 42 of the connector 20. The ring-shaped end face 89 of the ring-shaped protruded part 86 is located on an upper side "L1" with respect to the circular end face 85a on the lower side "L2" of the first protruded part 85. The rectangular end face 90a (under end face) of the second protruded part 90 is located at the same height position as the circular end face 85a of the first protruded part 85 in the axial line "L" direction and is located on one imaginary face "S" perpendicular to the axial line "L".

The sealing member tube part 66 is, as shown in FIG. 7, provided from the lower side "L2" to the upper side "L1" with a large diameter tube portion 91 and a small diameter tube portion 92 whose outer diameter dimension is smaller than that of the large diameter tube portion 91. As shown in FIG. 2, an outer diameter of the large diameter tube portion 91 is larger than an outer diameter of the ring-shaped part 35 of the stator core 31, and an outer diameter of the small diameter tube portion 92 is smaller than the outer diameter of the ring-shaped part 35 of the stator core 31.

As shown in FIG. 7, a plurality of circular arc-shaped opening parts 93 is provided in a boundary portion between the large diameter tube portion 91 and the small diameter tube portion 92 in the sealing member tube part 66 so that outer peripheral edge portions of the ring-shaped part 35 of the stator core 31 are exposed to the upper side "L1" from the resin sealing member 13. Further, a ring-shaped end face 94 perpendicular to the axial line "L" is provided on an outer peripheral side of the circular arc-shaped opening parts 93 of the resin sealing member 13. The ring-shaped part exposed portions 35a of the stator core 31 which are exposed from the circular arc-shaped opening parts 93 and the ring-shaped end face 94 are located on the same plane perpendicular to the axial line "L". An upper end portion of the large diameter tube portion 91 is provided with four engaging projections 95 which are projected to an outer peripheral side with equal angular intervals.

An inner peripheral face of the sealing member tube part 66 is provided from the lower side "L2" to the upper side "L1" with a small diameter inner peripheral face portion 96 and a large diameter inner peripheral face portion 97 whose inner diameter dimension is larger than that of the small diameter inner peripheral face portion 96. A curvature radius of the small diameter inner peripheral face portion 96 is substantially equal to a curvature radius of the inner peripheral side end faces 36a of the salient pole parts 36. The small diameter inner peripheral face portion 96 is provided with a plurality of opening parts 98 which expose the inner peripheral side end faces 36a of the respective salient pole parts 36 of the stator core 31 to the inner peripheral side. Further, the small diameter inner peripheral face portion 96 is provided with cut-out parts 99 which expose end portions on an inner peripheral side of the respective salient pole parts 36 to the upper side "L1". Each of the cut-out parts 99 is formed in a groove shape which is extended in the axial line "L" direction from an edge of the opening part 98 to an upper end edge of the small diameter inner peripheral face portion 96. Since a plurality of the cut-out parts 99 is provided, a center portion in the circumferential direction of an upper face of an end portion on an inner peripheral side of each of the salient pole parts 36 is formed as a salient pole part exposed portion 36b which is exposed to the upper side "L1".

Inner peripheral side end faces 36a of the respective salient pole parts 36 which are exposed from the opening parts 98 are continuously connected with the small diameter inner peripheral face portion 96 without a step. An anti-rust agent is applied to the inner peripheral side end faces 36a of the respective salient pole parts 36 which are exposed from the opening parts 98. Further, the anti-rust agent is also applied to the salient pole part exposed portions 36b of the respective salient pole parts 36 which are exposed from the cut-out parts 99. The anti-rust agent is, for example, an epoxy coating.

As shown in FIG. 6, the connector sealing part 67 covers the connector 20 from the upper side "L1" and a lower end portion of the frame part 43 is exposed to the lower side "L2". In other words, in the connector 20, the step part end face 46a of the frame part 43 (first step part portion end face 51a and second step part portion end face 52a), a portion which is located on the lower side "L2" from the step part end face 46a, and the connection step part end face 53a are not covered by the connector sealing part 67 and are exposed to the outside.

Further, as shown in FIG. 4, the connector sealing part 67 is provided with an outer peripheral face portion 70 on its outer peripheral face which surrounds the frame part 43 and are respectively continuously connected with the first step part portion end face 51a, the second step part portion end face 52a, and the connection step part end face 53a without a step. The outer peripheral face portion 70 is provided with a first outer peripheral face portion 70a which is continuously connected with the first step part portion end face 51a without a step on an outer peripheral side of the first step part portion end face 51a, a second outer peripheral face portion 70b which is continuously connected with the second step part portion end face 52a without a step on an outer peripheral side of the second step part portion end face 52a, and a third outer peripheral face portion 70c which is continuously connected with the connection step part end face 53a without a step on an outer peripheral side of the connection step part end face 53a. When viewed in the axial line "L" direction, the first outer peripheral face portion 70a and the second outer peripheral face portion 70b are formed in a ring shape surrounding the frame part 43.

In this embodiment, as shown in FIG. 2, a lower end portion of the frame part 43 of the connector 20 which is exposed to the lower side "L2" from the resin sealing member 13 is not projected to the lower side from the imaginary face "S". In other words, the lower end of the connector 20 (lower end of the frame part 43) is located on the upper side "L1" with respect to the circular end face 85a of the first protruded part 85 of the sealing member bottom part 65 and the rectangular end face 90a of the second protruded part 90. Further, as shown in FIG. 4, a length dimension "D1" in the circumferential direction of the second protruded part 90 is longer than a length dimension "D2" in the circumferential direction of the opening 43a of the frame part 43. Therefore, when the pump device 1 is placed on a placing surface of a workbench or the like in a posture that its opposite-to-output side is disposed on the lower side "L2", the pump device 1 stands on its own with the circular end face 85a of the first protruded part 85 and the rectangular end face 90a of the second protruded part 90 of the sealing member bottom part 65 as a setting face. Further, a tip end of the frame part 43 of the connector 20 which is exposed to the lower side "L2" from the resin sealing member 13 is not contacted with the placing surface of the workbench.

The resin sealing member 13 is formed of BMC (Bulk Molding Compound). In this embodiment, the stator 11 and the connector 20 are disposed in a die and resin is injected into the die and cured and, as a result, the resin sealing member 13 is formed. In other words, the resin sealing member 13 is integrally molded with the stator 11 and the connector 20 by insert molding.

(Cover Member)

Figure 13:
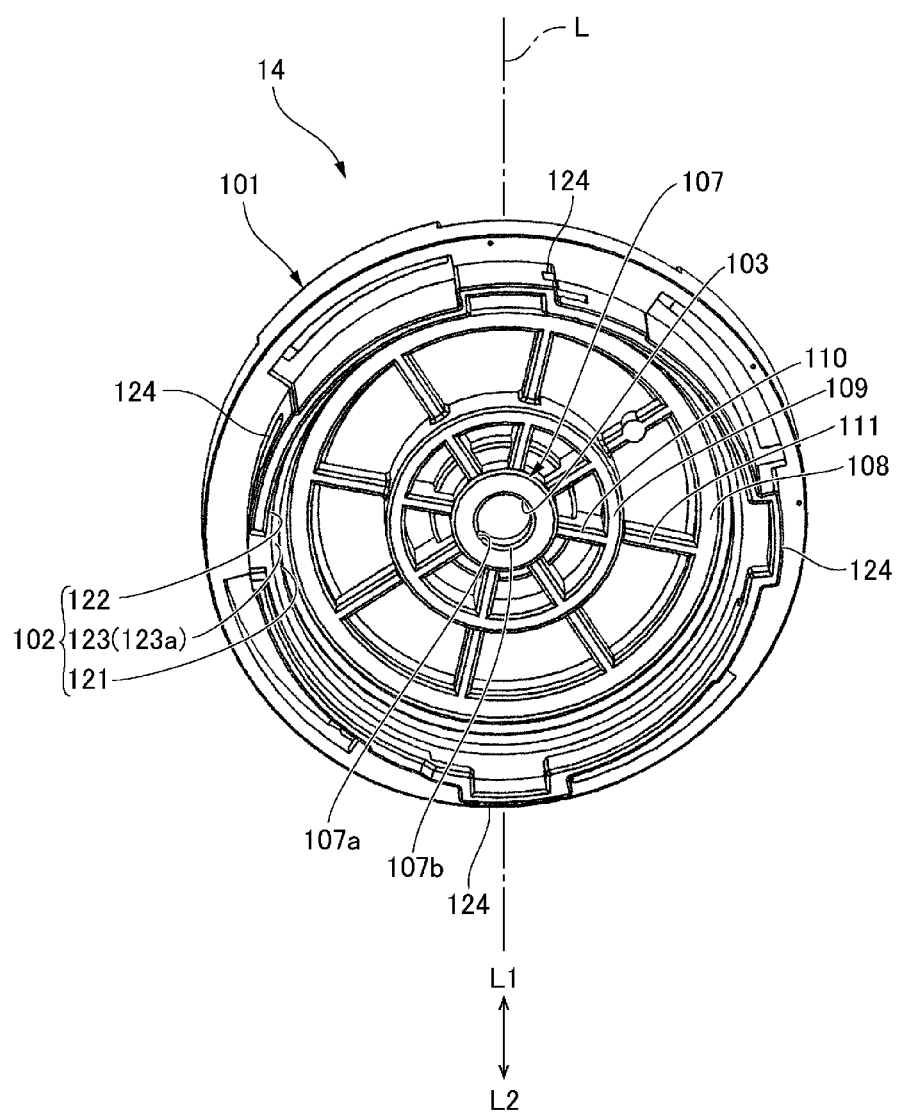
FIG. 13 is a perspective view showing a cover member which is viewed from an opposite-to-output side.

FIG. 13 is a perspective view showing a cover member 14 which is viewed from the lower side "L2". The cover member 14 is made of resin and is fixed to the upper side "L1" of the resin sealing member 13. As shown in FIGS. 6 and 13, the cover member 14 is provided with a cover member ceiling part 101 in a circular plate shape and a cover member tube part 102 which is extended to the lower side "L2" from an outer peripheral side of the cover member ceiling part 101.

As shown in FIG. 13, the cover member ceiling part 101 is provided with a through hole 103 which penetrates through the center in the axial line "L" direction. When viewed in the axial line "L" direction, the through hole 103 is located at a position overlapping with the bearing member holding recessed part 68 of the resin sealing member 13. As shown in FIG. 5, a center portion of an upper face of the cover member ceiling part 101 is provided with a circular recessed part 104 surrounding the through hole 103. A sealing member 105 in a circular ring shape is inserted from the upper side "L1" and fixed to the circular recessed part 104.

As shown in FIG. 13, an under face of the cover member ceiling part 101 is provided in the center portion with a bearing member holding tube part 107 which is coaxial with the through hole 103. A center hole of the bearing member holding tube part 107 is the through hole 103. The under face of the cover member ceiling part 101 is provided with an outer side ring-shaped rib 108 along its circular outer peripheral edge. In addition, the under face of the cover member ceiling part 101 is provided with a circular inner side ring-shaped rib 109 between the bearing member holding tube part 107 and the outer side ring-shaped rib 108. Inner side ribs 110 which are radially extended from the bearing member holding tube part 107 and reach the inner side ring-shaped rib 109 are provided between the bearing member holding tube part 107 and the inner side ring-shaped rib 109. Outer side ribs 111 which are radially extended from the inner side ring-shaped rib 109 and reach the outer side ring-shaped rib 108 are provided between the inner side ring-shaped rib 109 and the outer side ring-shaped rib 108. The bearing member holding tube part 107, the outer side ring-shaped rib 108 and the inner side ring-shaped rib 109 are coaxial with each other. An under end face of the bearing member holding tube part 107, an under end face of the outer side ring-shaped rib 108, and an under end face of inner side ring-shaped rib 109 are planes perpendicular to the axial line "L".

As shown in FIG. 2, a protruding amount of the bearing member holding tube part 107 from the under face of the cover member ceiling part 101 is larger than a protruding amount of the inner side ring-shaped rib 109 from the under face of the cover member ceiling part 101. Under faces of the inner side ribs 110 and an under face of the inner side ring-shaped rib 109 are located on the same plane. The protruding amount of the inner side ring-shaped rib 109 from the under face of the cover member ceiling part 101 is larger than a protruding amount of the outer side ring-shaped rib 108 from the under face of the cover member ceiling part 101. The under faces of the outer side ribs 111 and the under face of the outer side ring-shaped rib 108 are located on the same plane.

As shown in FIG. 13, the bearing member holding tube part 107 is provided with a groove 107a extended in the axial line "L" direction in a part in the circumferential direction of an inner peripheral wall of the center hole (through hole 103). Further, the bearing member holding tube part 107 is provided with a cut-out part 107b in a taper shape which is inclined to the upper side "L1" toward the center hole at an opening edge of the center hole in the under end face. As shown in FIG. 6, the second bearing member 16 is held by the center hole of the bearing member holding tube part 107.

The second bearing member 16 uses the same member as the first bearing member 15 shown in FIG. 12 which is disposed with their upper and lower sides reversed. Therefore, the second bearing member 16 is provided with a tube part 71 having a center hole through which the output shaft 6 is penetrated and a flange part 72 which is enlarged from a lower end of the tube part 71 to an outer peripheral side. A part in a circumferential direction of an outer peripheral face of the tube part 71 is formed with a groove part 73 which is extended in the axial line "L" direction with a constant width. Further, a projecting part 74 which is extended in the axial line "L" direction with a constant width is formed on an outer peripheral face of the tube part 71 on an opposite side to the groove part 73 with the axial line "L" interposed therebetween. The groove part 73 is formed with a gate trace 75 which was connected with a gate for resin injection when the second bearing member 16 was injection-molded. A contour of the flange part 72 is, when viewed in the axial line "L" direction, a "D"-shape having a straight contour portion 72a extended in a straight shape and a circular arc contour portion 72b in a circular arc shape connecting both ends of the straight contour portion 72a with each other. The straight contour portion 72a is provided at the same angular position as the groove part 73 around the axial line "L". In other words, the straight contour portion 72a is located on an opposite side to the projecting part 74 with the axial line "L" interposed therebetween. A lower end face of the tube part 71 located on an inner peripheral side of the flange part 72 is formed with a tapered face 76 which is inclined to the upper side "L1" toward the center hole of the tube part 71.

The tube part 71 of the second bearing member 16 is inserted into the bearing member holding tube part 107 in a posture that positions of the projecting part 74 of the tube part 71 and the groove 107a of the bearing member holding tube part 107 are coincided with each other around the axial line "L". Next, as shown in FIG. 6, the flange part 72 is abutted with the bearing member holding tube part 107 from the lower side "L2" and the second bearing member 16 is fixed to the bearing member holding tube part 107. In a state that the second bearing member 16 is fixed to the bearing member holding tube part 107, a lower end face of the flange part 72 is perpendicular to the axial line "L". Further, the tube part 71 and the sealing member 105 face each other with a space therebetween in the axial line "L" direction. In addition, in the under end face of the bearing member holding tube part 107, an opening 115 (gap space) is formed between the straight contour portion 72a of the flange part 72 and the cut-out part 107b of the bearing member holding tube part 107.

The second bearing member 16 supports the rotor 10 in a state that the output shaft 6 is penetrated through the second bearing member 16. The tube part 71 of the second bearing member 16 supports the output shaft 6 (rotor 10) movable in the axial line "L" direction and rotatably supports the output shaft 6 around the axial line "L". The flange part 72 is capable of slidably contacting with the rotor main body 22 (second bearing plate 27) from the upper side "L1". Therefore, when the rotor 10 is rotated, the rotor 10 is moved in the axial line "L" direction between a lower position (see FIG. 2) where the rotor main body 22 is slidably contacted with the flange part 72 of the first bearing member 15 and an upper position where the rotor main body 22 is slidably contacted with the flange part 72 of the second bearing member 16.

A gap space between the second bearing member 16 and the sealing member 105 (through hole portion which is located on the upper side "L1" and on the output side with respect to the second bearing member 16) on an inner side of the through hole 103 is a second lubricant storage part 118 where lubricant 119 such as grease is stored. As shown in FIG. 2, the opening 115 of the under end face of the bearing member holding tube part 107 and the second lubricant storage part 118 is communicated with each other through a gap space between the groove part 73 of the tube part 71 and an inner wall face of the center hole of the bearing member holding tube part 107. In other words, the gap space between the groove part 73 of the tube part 71 and the inner wall face of the center hole of the bearing member holding tube part 107 is a communication path 116 structured to communicate the opening 115 with the second lubricant storage part 118.

The cover member tube part 102 is, as shown in FIGS. 6 and 13, extended to the lower side "L2" from an outer peripheral side with respect to the outer side ring-shaped rib 108. The cover member tube part 102 is, as shown in FIG. 2, provided with an upper side ring-shaped tube portion 121, which is overlapped and covers the small diameter tube portion 92 of the resin sealing member 13 from an outer peripheral side, and a lower side ring-shaped tube portion 122 which is located on an outer peripheral side of the large diameter tube portion 91 on a lower side with respect to the upper side ring-shaped tube portion 121. A ring-shaped step part 123 is provided between the upper side ring-shaped tube portion 121 and the lower side ring-shaped tube portion 122 in an inner peripheral face of the cover member tube part 102. The ring-shaped step part 123 is provided with a ring-shaped face 123a which faces the lower side "L2". The ring-shaped face 123a is a plane perpendicular to the axial line "L". As shown in FIGS. 6 and 13, the lower side ring-shaped tube portion 122 is provided with an engaged part 124 which is engaged with the engaging projection 95 of the resin sealing member 13 at four positions in the circumferential direction.

The resin sealing member 13 is covered with the cover member 14 from the upper side "L1" in a state that the rotor 10 is disposed on an inner side of the resin sealing member 13 and the rotor 10 is supported by the first bearing member 15. When the resin sealing member 13 is to be covered with the cover member 14, an adhesive is applied to an outer peripheral edge portion of an upper face of the resin sealing member 13.

When the resin sealing member 13 is to be covered with the cover member 14, as shown in FIG. 2, the output shaft 6 is penetrated through the tube part 71 of the second bearing member 16 which is held by the cover member 14, and the lower end portion of the inner side ring-shaped rib 109 is fitted into an inner peripheral side of the sealing member tube part 66 of the resin sealing member 13. As a result, the cover member 14 and the resin sealing member 13 are positioned each other in the radial direction, and the axial line "L" of the output shaft 6 and the center axial line of the stator 11 are coincided with each other. Further, the ring-shaped face 123a of the ring-shaped step part 123 of the cover member tube part 102 is abutted with the ring-shaped end face 94 between the large diameter tube portion 91 and the small diameter tube portion 92 of the resin sealing member 13. As a result, the cover member 14 and the resin sealing member 13 are positioned each other in the axial line "L" direction. After that, the cover member 14 and the resin sealing member 13 are relatively turned in the circumferential direction and, as shown in FIG. 1, the engaging projections 95 of the resin sealing member 13 and the engaged parts 124 of the cover member 14 are engaged with each other. In this manner, the cover member ceiling part 101 covers the rotor 10 and the resin sealing member 13 from the upper side "L1" in a state that the output shaft 6 is penetrated through the cover member ceiling part 101 in the axial line "L" direction. Further, the output shaft 6 is penetrated through the sealing member 105 which is disposed in the circular recessed part 104 of the cover member ceiling part 101. The sealing member 105 seals between the output shaft 6 and the cover member 14. In addition, the upper side ring-shaped tube portion 121 of the cover member tube part 102 surrounds the small diameter tube portion 92 of the resin sealing member 13 from the outer peripheral side.

When the cover member 14 is fixed to the resin sealing member 13, the rotor 10 is supported by the first bearing member 15 and the second bearing member 16 in a state that the rotor main body 22 is movable in the axial line "L" direction between the lower position where the rotor main body 22 is slidably contacted with the upper end face 80 of the flange part 72 of the first bearing member 15 and the upper position where the rotor main body 22 is slidably contacted with the under end face of the flange part 72 of the second bearing member 16, and in a state that the rotor main body 22 is rotatable around the axial line "L".

An impeller 5 is connected with an upper end portion of the output shaft 6. After that, the cover member 14 is covered with the case body 3 from the upper side "L1". As a result, a space sectioned between the cover member 14 and the case body 3 is structured as the pump chamber 4, and the impeller 5 is disposed in an inside of the pump chamber 4.

(Insert Molding of Stator and Connector)

Figure 14A:
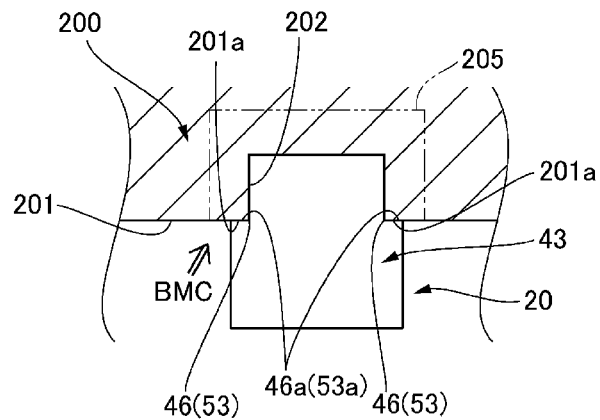
FIGS. 14A and 14B are explanatory views showing a die for molding a resin sealing member.
Figure 14B:
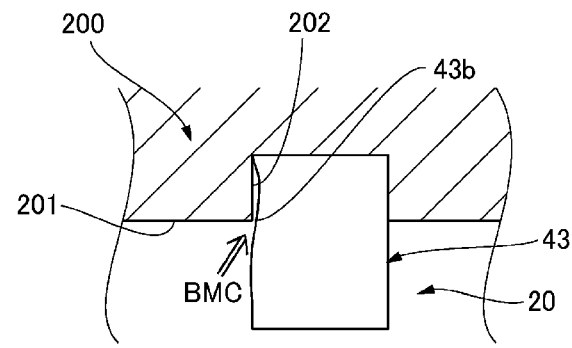

Next, insert molding of the resin sealing member 13 will be described below. FIGS. 14A and 14B are explanatory views showing a die portion for exposing a tip end portion of the frame part 43 of the connector 20 to the outside in a die for molding the resin sealing member. FIG. 14A shows a die in a case that the frame part 43 of the connector 20 is provided with the step part 46, and FIG. 14B shows a die in a case that the frame part 43 of the connector 20 is provided with no step part 46. In the insert molding, resin is injected into a die 200 and cured in a state that the stator 11 and the connector 20 are disposed in the die 200.

As shown in FIG. 7, in this embodiment, the inner peripheral side end faces of the respective salient pole parts 36 of the stator core 31 are exposed from the resin sealing member 13. Therefore, in the insert molding, a circular cylindrical shape portion to which the stator core 31 is fitted is provided in the die 200, and an outer peripheral face of the circular cylindrical shape portion is abutted with the inner peripheral side end faces of the respective salient pole parts 36. Therefore, the stator core 31 can be positioned in the radial direction in an inside of the die 200 and thus accuracy of relative positions in the radial direction of the stator core 31 and the resin sealing member 13 is enhanced.

In addition, the stator core 31 is provided with the salient pole part exposed portions 36b exposed to the upper side "L1" from the resin sealing member 13 at the end portions on the inner peripheral side of the respective salient pole parts 36. Further, the stator core 31 is provided with the ring-shaped part exposed portions 35a exposed to the upper side "L1" from the resin sealing member 13 on the outer peripheral edge portion of the ring-shaped part 35. Therefore, in the insert molding, the die 200 is provided with a plurality of pins which are capable of abutting with the respective salient pole part exposed portions 36b of the stator core 31 from the upper side "L1" and an abutting portion which is capable of abutting with the ring-shaped part exposed portions 35a from the upper side "L1" and the plurality of the pins and the abutting portion are abutted with the stator core 31. As a result, the stator core 31 can be positioned in the axial line "L" direction in the inside of the die 200 and thus accuracy of relative positions in the axial line "L" direction of the stator core 31 and the resin sealing member 13 is enhanced. In this embodiment, the cut-out parts 99 provided on the inner peripheral face of the sealing member tube part 66 are traces of the plurality of the pins provided in the die 200.

In addition, in this embodiment, the connector 20 is provided with the step part 46 and the connection step part 53 in the frame part 43. Therefore, in the insert molding, as shown in FIG. 14A, an inner peripheral face 201 of the die 200 is provided with a die recessed part 202 whose opening edge 201a is abutted with the step part end face 46a and the connection step part end face 53a and which accommodates a tip end side of the frame part 43 with respect to the step part end face 46a.

In this case, in a state that the end part end face 46a and the connection step part end face 53a of the frame part 43 are abutted with the opening edge 201a of the die recessed part 202 on the inner peripheral face 201 of the die 200, when the tip end side of the frame part 43 with respect to the step part end face 46a is inserted into the die recessed part 202, the die recessed part 202 is isolated from other spaces in the die 200 by abutting of the face of the opening edge 201a of the die recessed part 202 with the faces of the step part end face 46a and the connection step part end face 53a of the frame part 43. Therefore, when resin BMC is injected into the die 200, the resin BMC is not flowed and entered into the die recessed part 202. Accordingly, the tip end portion of the frame part 43 inserted into the die recessed part 202 can be exposed from the resin sealing member 13 to the outside.

Further, the resin BMC which is injected into the die 200 is not flowed and entered into the die recessed part 202 and thus the tip end portion of the frame part 43 is not deformed by the pressure of the resin BMC. Therefore, the resin BMC can be prevented from flowing and entering into the inner side of the frame part 43 through a gap space between the die 200 and a deformed portion of the frame part 43. Accordingly, the resin BMC injected into the die 200 can be prevented from being hardened on the inner side of the frame part 43.

In this case, in a case that the connector 20 is not provided with the step part 46 and the connection step part 53 in the frame part 43, even when the die recessed part 202 into which a tip end portion of the frame part 43 is inserted is provided on the inner peripheral face 201 of the die 200, the tip end portion of the frame part 43 may be deformed. In other words, in a case that the step part 46 and the connection step part 53 are not provided in the frame part 43, as shown in FIG. 14B, the die recessed part 202 and other spaces in the die 200 are not isolated and thus the resin BMC may be flowed and entered into a gap space between the inner wall face of the die recessed part 202 and the frame part 43. Therefore, the tip end portion of the frame part 43 is deformed and the resin BMC is flowed and entered into the die recessed part 202 through a gap space between the die 200 and the deformed portion 43b of the frame part 43.

Further, the resin BMC may be reached to an inner side of the frame part 43 in die recessed part 202. Accordingly, the resin BMC injected into the die 200 may be hardened on an inner side of the frame part 43.

In this embodiment, the outer peripheral face portion 70 continuously connected with the step part 46 without a step in the outer peripheral face of the resin sealing member 13 (first outer peripheral face portion 70a, second outer peripheral face portion 70b and third outer peripheral face portion 70c) is a trace of the opening edge 201a of the die recessed part 202 in the inner peripheral face 201 of the die 200.

In the insert molding described above, the die recessed part 202 is provided in an inner peripheral face of a die. However, as shown by the imaginary line in FIG. 14A, instead of providing the die recessed part 202 in an inner peripheral face of a die, a box-shaped frame 205 provided with a recessed part similar to the die recessed part 202 may be disposed in the die 200. In this case, insert molding is performed in a state that a portion of the frame part 43 on the lower side "L2" with respect to the step part 46 is inserted into a recessed part of the box-shaped frame 205, and that a face of the step part end face 46a of the frame part 43 is abutted with a face of an opening edge of the recessed part in the box-shaped frame 205.

Operations and Effects

According to this embodiment, in the connector 20, an outer peripheral face of the frame part 43 into which a cable side connector 19 is to be inserted is provided with the step part 46 at a midway position in the inserting direction. Therefore, a thickness of a portion of the frame part 43 on the upper side "L1" with respect to the step part end face 46a is increased and thus rigidity of the frame part 43 is increased. Accordingly, the portion of the frame part 43 on the upper side "L1" with respect to the step part end face 46a is capable of enduring pressure of resin BMC injected into the die 200 at the time of insert molding.

Further, the outer peripheral face of the frame part 43 is provided with the ring-shaped step part 46 when viewed in the axial line "L" direction. Therefore, the die 200 is provided with the die recessed part 202 and, when insert molding is to be performed, the portion on the lower side "L2" of the frame part 43 with respect to the step part 46 is inserted into the die recessed part 202 and the step part end face 46a is abutted with the opening edge 201a of the die recessed part 202 in the inner peripheral face 201 of the die 200. As a result, the resin BMC injected into the die 200 can be prevented from flowing and entering into the die recessed part 202. Therefore, the resin BMC can be prevented from flowing and entering into an inner side of the tip end part of the frame part 43 disposed in the die recessed part 202. Accordingly, hardening of the resin BMC injected into the die 200 can be avoided on an inner side of the frame part 43. As a result, connection of the connector 20 partially covered by the resin sealing member 13 with a cable side connector 19 is not obstructed by the resin BMC which is molding material for the resin sealing member 13.

Further, in this embodiment, an inserting direction of a cable side connector 19 is a direction directing from the lower side "L2" to the upper side "L1" along the axial line "L". Therefore, in comparison with a case that an inserting direction of a cable side connector 19 is set in a direction inclined to the axial line "L" of the output shaft 6, the size of the motor 2 can be reduced in the radial direction. In other words, in a case that an inserting direction of a cable side connector 19 is set in a direction inclined to the axial line "L" of the output shaft 6 or, in a direction perpendicular to the axial line "L", an extending direction of the frame part 43 is required to be inclined with respect to the axial line "L" or set to be perpendicular to the axial line "L". However, when an inserting direction of a cable side connector 19 is set in the axial line "L" direction, the frame part 43 can be provided along the axial line "L" and thus the size of the motor 2 can be reduced in the radial direction.

In addition, in this embodiment, the first step part portion 51 provided in the first frame plate portion 47 of the frame part 43 is located on the lower side "L2" with respect to the second step part portion 52 provided in the outer peripheral face of the second frame plate portion 48, the third frame plate portion 49 and the fourth frame plate portion 50. Therefore, a portion of the resin sealing member 13 which covers the connector 20 can be increased and thus the connector 20 can be prevented from coming off from the resin sealing member 13.

Further, the frame part 43 is provided with engaging opening parts 54 for engaging a cable side connector 19 on the lower side "L2" with respect to the second step part portion 52 of the third frame plate portion 49 and on the lower side "L2" with respect to the second step part portion 52 of the fourth frame plate portion 50. Therefore, in a case that a cable side connector 19 is provided with engaging claws, when the engaging claws are engaged with the engaging opening parts 54, coming-off of the cable side connector 19 can be prevented. In this case, when the engaging opening parts 54 are provided in the frame part 43, rigidity of the frame part 43 is decreased. However, the portion provided with the engaging opening parts 54 is inserted into the die recessed part 202 provided in the die 200 at the time of insert molding. Therefore, the portion of the frame part 43 where the engaging opening parts 54 are provided is not deformed by pressure of the resin injected into the die 200. Further, the resin injected into the die 200 is not flowed and not hardened in an inner side of the frame part 43 through the engaging opening parts 54.

In addition, in this embodiment, the connector housing 41 is provided with the ribs 58 in the extended part 45 which is located between the frame part 43 and the ring-shaped part 35 of the stator core 31 and is covered by the resin sealing member 13. Therefore, the frame part 43 is reinforced by the ribs 58 and thus the frame part 43 can be prevented from being deformed by the resin BMC injected into the die 200.

Further, in this embodiment, the insulator 32 attached to the stator core 31 and the connector 20 are structured to be one resin molded product. Therefore, when the resin sealing member 13 is to be insert-molded in a state that the stator core 31 around which the coils 33 are wound and the connector 20 are disposed in the die 200, the stator core 31 and the connector 20 can be prevented from being relatively moved by pressure of the injected resin BMC. In addition, in this embodiment, the rib 58 is provided between the coil wire connecting parts 63 of the terminal pins 42 adjacent to each other in the circumferential direction. Therefore, the frame part 43 is reinforced by the ribs 58 and the terminal pins 42 supported by the connector housing 41 can be prevented from being contacted with each other.

In addition, in the pump device 1 in this embodiment, connection of a cable 18 with the connector 20 of the motor 2 is not disturbed by the resin BMC which is molding material for the resin sealing member 13. Therefore, wiring to the pump device 1 can be performed surely.

OTHER EMBODIMENTS

In the embodiment described above, an inserting direction of a cable side connector 19 is the axial line "L" direction.

However, an extending direction of the frame part 43 of the connector 20 may be set in a direction inclined to the axial line "L", or in a direction perpendicular to the axial line "L" and, in this case, the inserting direction is set in a direction inclined to the axial line "L", or in a direction perpendicular to the axial line "L". Also in this case, the step part 46 is provided in the frame part 43 at a midway position in the inserting direction. Further, an outer peripheral face of the resin sealing member 13 is provided with an outer peripheral face portion 70 which is continuously connected with the step part end face 46a of the step part 46 without a step. According to this structure, the resin BMC which is the molding material for the resin sealing member 13 can be prevented from flowing into and being hardened on an inner side of the frame part 43 at the time of insert molding.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor comprising an output shaft;
   a stator comprising a plurality of coils which are arranged in a ring shape and surround the rotor;
   a connector which is located on an outer peripheral side with respect to the plurality of the coils and is capable of being detachably connected with a cable side connector of an external cable for supplying electrical power to the plurality of the coils; and
   a resin sealing member which covers the coils;
   wherein the connector comprises a frame part into which the cable side connector is to be inserted;
   wherein the frame part comprises a step part on an outer peripheral face of the frame part, the step part being enlarged to an outer peripheral side from a midway position in an inserting direction of the cable side connector and a shape of the step part when viewed from a rear side in the inserting direction is formed in a ring shape;
   wherein the step part comprises a step part end face which faces the rear side in the inserting direction;
   wherein the resin sealing member covers the connector from a front side in the inserting direction and exposes the step part end face of the frame part and a portion of the frame part located on the rear side from the step part end face in the inserting direction to an outside; and
   wherein an outer peripheral face of the resin sealing member comprises an outer peripheral face portion which surrounds the frame part and is continuously connected with the step part end face without a step.

2. The motor according to claim 1, wherein when one side in a direction of an axial line of the output shaft is referred to as an output side, and an other side in the axial line direction is referred to as an opposite-to-output side, the inserting direction is a direction directing to the output side from the opposite-to-output side.

3. The motor according to claim 2, wherein
   an outline shape of the frame part when viewed in a direction of the axial line is a rectangular shape,
   the frame part comprises:
      a first frame plate portion and a second frame plate portion which are extended in a circumferential direction around the axial line and face each other in a radial direction;
      a third frame plate portion which connects ends of the first frame plate portion and the second frame plate portion on one side in the circumferential direction with each other; and
      a fourth frame plate portion which connects other ends of the first frame plate portion and the second frame plate portion on an other side in the circumferential direction with each other,
   the step part comprises:
      a first step part portion provided in an outer peripheral face of the first frame plate portion which is located on an inner peripheral side with respect to the axial line; and
      a second step part portion which is continuously provided on outer peripheral faces of the second frame plate portion, the third frame plate portion and the fourth frame plate portion,
   the step part end face comprises:
      a first step part portion end face of the first step part portion which faces the opposite-to-output side; and
      a second step part portion end face of the second step part portion which faces the opposite-to-output side,
   the first step part portion end face is located on the opposite-to-output side with respect to the second step part portion end face, and
   the outer peripheral face portion of the resin sealing member comprises:
      a first outer peripheral face portion which is continuously connected with the first step part portion end face without a step; and
      a second outer peripheral face portion which is continuously connected with the second step part portion end face without a step.

4. The motor according to claim 3, wherein the frame part comprises engaging opening parts, which are to be engaged with the cable side connector, in the third frame plate portion on the opposite-to-output side with respect to the second step part portion and in the fourth frame plate portion on the opposite-to-output side with respect to the second step part portion.

5. The motor according to claim 2, wherein
   the stator comprises a stator core having a ring-shaped part and a plurality of salient pole parts which are protruded from the ring-shaped part to an inner side in a radial direction,
   each of the coils is wound around each of the salient pole parts through an insulator,
   the connector comprises a connector housing located on an outer peripheral side with respect to the ring-shaped part,
   the connector housing comprises:
      the frame part; and
      an extended part covered by the resin sealing member which is located between the frame part and the ring-shaped part on the output side with respect to the step part end face, and
   the extended part comprises a rib which is protruded to the opposite-to-output side and is extended from the frame part toward the ring-shaped part.

6. The motor according to claim 5, wherein
the insulator closest to the connector is structured to be one resin molded product which is integrally molded with the connector housing, and
the insulator comprises a connecting part which is extended on the opposite-to-output side of the ring-shaped part and is connected with the extended part.

7. The motor according to claim 6, wherein
the connector comprises a plurality of terminal pins for electrically connecting the cable with the plurality of the coils,
the connector housing comprises a closing part which closes an opening on the output side of the frame part,
the plurality of the terminal pins is arranged in a circumferential direction around the axial line separated from each other with a gap space therebetween and is supported by the connector housing,
each of the terminal pins comprises:
    an external connection part which is penetrated through the closing part and is extended on an inner side of the frame part;
    a connecting part which is extended from an end on the output side of the external connection part toward the ring-shaped part along the extended part on the output side of the extended part; and
    a coil wire connecting part which is penetrated through the extended part in the direction of the axial line from an end on a side of the ring-shaped part of the connecting part, and
the rib is provided between the coil wire connecting parts of the terminal pins adjacent to each other in the circumferential direction.

8. The motor according to claim 6, wherein
an outline shape of the frame part when viewed in a direction of the axial line is a rectangular shape,
the frame part comprises:
    a first frame plate portion and a second frame plate portion which are extended in a circumferential direction around the axial line and face each other in a radial direction;
    a third frame plate portion which connects ends of the first frame plate portion and the second frame plate portion on one side in the circumferential direction with each other; and
    a fourth frame plate portion which connects other ends of the first frame plate portion and the second frame plate portion on an other side in the circumferential direction with each other,
the step part comprises:
    a first step part portion provided in an outer peripheral face of the first frame plate portion which is located on an inner peripheral side with respect to the axial line; and
    a second step part portion which is continuously provided on outer peripheral faces of the second frame plate portion, the third frame plate portion and the fourth frame plate portion,
the step part end face comprises:
    a first step part portion end face of the first step part portion which faces the opposite-to-output side; and
    a second step part portion end face of the second step part portion which faces the opposite-to-output side,
the first step part portion end face is located on the opposite-to-output side with respect to the second step part portion end face, and
the outer peripheral face portion of the resin sealing member comprises:
    a first outer peripheral face portion which is continuously connected with the first step part portion end face without a step; and
    a second outer peripheral face portion which is continuously connected with the second step part portion end face without a step.

9. A pump device comprising:
the motor defined in claim 1;
a pump chamber; and
an impeller disposed in an inside of the pump chamber;
wherein the output shaft of the motor is extended in the inside of the pump chamber from an outside of the pump chamber and is connected with the impeller.

10. The pump device according to claim 9, wherein when one side in an direction of an axial line of the output shaft is referred to as an output side, and an other side in the axial line direction is referred to as an opposite-to-output side, the inserting direction is a direction directing to the output side from the opposite-to-output side.

11. The pump device according to claim 10, wherein
an outline shape of the frame part when viewed in a direction of the axial line is a rectangular shape,
the frame part comprises:
    a first frame plate portion and a second frame plate portion which are extended in a circumferential direction around the axial line and face each other in a radial direction;
    a third frame plate portion which connects ends of the first frame plate portion and the second frame plate portion on one side in the circumferential direction with each other; and
    a fourth frame plate portion which connects other ends of the first frame plate portion and the second frame plate portion on an other side in the circumferential direction with each other,
the step part comprises:
    a first step part portion provided in an outer peripheral face of the first frame plate portion which is located on an inner peripheral side with respect to the axial line; and
    a second step part portion which is continuously provided on outer peripheral faces of the second frame plate portion, the third frame plate portion and the fourth frame plate portion,
the step part end face comprises:
    a first step part portion end face of the first step part portion which faces the opposite-to-output side; and
    a second step part portion end face of the second step part portion which faces the opposite-to-output side,
the first step part portion end face is located on the opposite-to-output side with respect to the second step part portion end face, and
the outer peripheral face portion of the resin sealing member comprises:
    a first outer peripheral face portion which is continuously connected with the first step part portion end face without a step; and
    a second outer peripheral face portion which is continuously connected with the second step part portion end face without a step.

12. The pump device according to claim 11, wherein the frame part comprises engaging opening parts, which are to be engaged with the cable side connector, in the third frame plate portion on the opposite-to-output side with respect to the second step part portion and in the fourth frame plate portion on the opposite-to-output side with respect to the second step part portion.

13. The pump device according to claim 10, wherein
the stator comprises a stator core having a ring-shaped part and a plurality of salient pole parts which are protruded from the ring-shaped part to an inner side in a radial direction,
each of the coils is wound around each of the salient pole parts through an insulator,
the connector comprises a connector housing located on an outer peripheral side with respect to the ring-shaped part,
the connector housing comprises:
the frame part; and
an extended part covered by the resin sealing member which is located between the frame part and the ring-shaped part on the output side with respect to the step part end face, and
the extended part comprises a rib which is protruded to the opposite-to-output side and is extended from the frame part toward the ring-shaped part.

14. The pump device according to claim 13, wherein
the insulator closest to the connector is structured to be one resin molded product which is integrally molded with the connector housing, and
the insulator comprises a connecting part which is extended on the opposite-to-output side of the ring-shaped part to be connected with the extended part.

15. The pump device according to claim 14, wherein
the connector comprises a plurality of terminal pins for electrically connecting the cable with the plurality of the coils,
the connector housing comprises a closing part which closes an opening on the output side of the frame part,
the plurality of the terminal pins is arranged in a circumferential direction around the axial line separated from each other with a gap space therebetween and is supported by the connector housing,
each of the terminal pins comprises:
an external connection part which is penetrated through the closing part and is extended on an inner side of the frame part;
a connecting part which is extended from an end on the output side of the external connection part toward the ring-shaped part along the extended part on the output side of the extended part; and
a coil wire connecting part which is penetrated through the extended part in the direction of the axial line from an end on a side of the ring-shaped part of the connecting part, and
the rib is provided between the coil wire connecting parts of the terminal pins adjacent to each other in the circumferential direction.

\* \* \* \* \*